(12) United States Patent
Dohi et al.

(10) Patent No.: US 11,415,185 B2
(45) Date of Patent: Aug. 16, 2022

(54) REVERSE-INPUT BLOCKING CLUTCH

(71) Applicant: NSK LTD., Tokyo (JP)

(72) Inventors: Nagao Dohi, Fujisawa (JP); Yuya Daikoku, Fujisawa (JP)

(73) Assignee: NSK, Ltd., Tokyo (JP)

( * ) Notice: Subject to any disclaimer, the term of this patent is extended or adjusted under 35 U.S.C. 154(b) by 0 days.

(21) Appl. No.: 17/606,641

(22) PCT Filed: Dec. 17, 2020

(86) PCT No.: PCT/JP2020/047175
§ 371 (c)(1),
(2) Date: Oct. 26, 2021

(87) PCT Pub. No.: WO2021/125274
PCT Pub. Date: Jun. 24, 2021

(65) Prior Publication Data
US 2022/0228630 A1    Jul. 21, 2022

(30) Foreign Application Priority Data

Dec. 20, 2019   (JP) .............................. JP2019-230081

(51) Int. Cl.
*F16D 41/08*  (2006.01)
*F16D 43/02*  (2006.01)
(Continued)

(52) U.S. Cl.
CPC ........... *F16D 41/084* (2013.01); *F16D 41/10* (2013.01); *F16D 43/02* (2013.01); *F16D 43/211* (2013.01); *F16D 59/00* (2013.01)

(58) Field of Classification Search
CPC ...... F16D 41/069; F16D 41/08; F16D 41/084; F16D 41/10; F16D 43/02; F16D 43/211;
(Continued)

(56) References Cited

U.S. PATENT DOCUMENTS 1,617,745 A  *  2/1927  Coisinard ............... F16D 59/02
                                                 192/223.3
2,031,186 A      2/1936  Still
(Continued)

FOREIGN PATENT DOCUMENTS

EP      3663601       10/2020
WO      2019026794    8/2019

OTHER PUBLICATIONS

International Search Report for International Application No. PCT/JP2020/047175, dated Feb. 2, 2021, 2 pages.

*Primary Examiner* — Richard M Lorence
(74) *Attorney, Agent, or Firm* — Hartman Global IP Law; Gary M. Hartman; Domenica N. S. Hartman

(57) ABSTRACT

A reverse-input blocking clutch includes: a pressed member having a pressed surface; an input member having an input-side engaging portion on an inner side in a radial direction of the pressed surface; an output member having an output-side engaging portion further on the inner side in the radial direction than the input-side engaging portion; an engaging element on the inner side in the radial direction of the pressed surface to move in a first direction away from or toward the pressed surface, having a main engaging element body having a pivot-support shaft, and a link member having a first end portion pivotally linked to the pivot-support shaft and a second end portion pivotally linked to the input-side engaging portion; and an elastic body between the main engaging element body and the link member and applying an elastic force to the link member toward the pressed surface in the first direction.

11 Claims, 29 Drawing Sheets

(51) Int. Cl.
*F16D 43/21* (2006.01)
*F16D 41/10* (2006.01)
*F16D 59/00* (2006.01)

(58) Field of Classification Search
CPC .......... F16D 51/10; F16D 51/12; F16D 59/00; F16D 59/02; F16D 65/22; F16D 67/02; F16B 1/02; F16B 1/04
USPC ........................................................ 192/223
See application file for complete search history.

(56) References Cited

U.S. PATENT DOCUMENTS

| | | | | | |
|---|---|---|---|---|---|
| 2,359,010 | A | * | 9/1944 | Smith | F16B 1/04 192/223.1 |
| 3,024,884 | A | * | 3/1962 | Sieber | F16B 1/04 188/82.8 |
| 3,335,831 | A | * | 8/1967 | Kalns | F16B 1/04 74/625 |
| 5,007,511 | A | * | 4/1991 | Ostrander | F16D 59/00 192/223 |
| 11,300,166 | B2 | * | 4/2022 | Dohi | F16D 41/069 |

\* cited by examiner

REVERSE-INPUT BLOCKING CLUTCH

CROSS REFERENCE TO RELATED APPLICATIONS

This application claims the benefit of PCT/JP2020/047175 filed Dec. 17, 2020, having a priority claim to Japanese Patent Application No. 2019-230081 filed Dec. 20, 2019. The contents of these prior patent documents are incorporated herein by reference.

TECHNICAL FIELD

The present invention relates to a reverse-input blocking clutch that transmits rotational torque that is inputted to an input member to an output member; however, completely blocks rotational torque that is reversely inputted to the output member and does not transmit the reversely inputted torque to the input member, or transmits only a part of the reversely inputted torque and blocks the remaining part.

BACKGROUND ART

The reverse-input blocking clutch includes an input member that is connected to an input-side mechanism such as a drive source or the like, and an output member that is connected to an output-side mechanism such as a speed-reducing mechanism or the like, and has a function of transmitting rotational torque that is inputted to the input member to the output member, while completely blocking rotational torque that is reversely inputted to the output member and not transmitting the reversely inputted torque to the input member, or transmitting only a part of the reversely inputted torque and blocking the remaining part.

FIG. 23 to FIG. 29 illustrate an example of conventional construction of a reverse-input blocking clutch such as described in WO 2019/026794.

A reverse-input blocking clutch 101 includes an input member 102, an output member 103, a pressed member 104, and a pair of engaging elements 105.

The input member 102 is connected to an input-side mechanism such as an electric motor or the like, and rotational torque is inputted to the input member 102. The input member 102, as illustrated in FIG. 25, has an input-shaft portion 106, and a pair of input-side engaging portions 107. The base-end portion of the input-shaft portion 106 is connected to the input-side mechanism. The pair of input-side engaging portions 107 are configured by convex portions that extend in the axial direction from two locations on the tip-end surface of the input-shaft portion 106 on opposites sides in the radial direction.

The output member 103 is connected to an output-side mechanism such as a speed-reducing mechanism or the like, and outputs rotational torque. The output member 103 is coaxially arranged with the input member 102, and as illustrated in FIG. 26, has an output-shaft portion 108 and an output-side engaging portion 109. The base-end portion of the output-shaft portion 108 is connected to the input portion of the output-side mechanism. The output-side engaging portion 109 has an elliptical columnar shape that extends in the axial direction from the central portion of the tip-end surface of the output-shaft portion 108. The output-side engaging portion 109 is arranged in a portion between the pair of input-side engaging portions 107.

The pressed member 104, as illustrated in FIG. 24, has an annular shape, and by being fastened to another member (not illustrated) such as a housing or the like, the rotation of the pressed member 104 is restricted. The pressed member 104 is coaxially arranged with the input member 102 and the output member 103, and is arranged on the outer side in the radial direction of the pair of input-side engaging portions 107 and the output-side engaging portion 109. The pressed member 104 has a pressed surface 110, which is an annular concave surface, formed around the inner peripheral surface thereof.

Each engaging element 105 of the pair of engaging elements 105 is configured into a semi-circular plate shape, and is arranged on the inner side in the radial direction of the pressed member 104. The engaging elements 105 respectively have a partial cylindrical convex pressing surface 111 formed around the outer-side surface in the radial direction facing the pressed surface 110, and have a bottom surface 112 on the inner-side surface in the radial direction, the inner-side surfaces of the pair of the engaging elements 105 facing each other. The bottom surface 112 is configured by a flat surface except a part where an output-side engaged portion 114 (described later) is formed. The radius of curvature of the pressing surface 111 is equal to or less than the radius of curvature of the pressed surface 110. Note that the radial direction of the engaging element 105 refers to a direction orthogonal to the bottom surface 112 as indicated by an arrow A in FIG. 23, and the direction parallel to the bottom surface 112 indicated by an arrow B in FIG. 23 refers to the width direction of the engaging element 105.

In a state in which the pair of engaging elements 105 is arranged on the inner side in the radial direction of the pressed member 104, the inner-diameter dimension of the pressed member 104 and the dimension in the radial direction of the engaging elements 105 are regulated so that there is a gap in at least one of the portion between the pressed surface 110 and the pressing surface 111, and the portion between the bottom surfaces 112.

The engaging element 105 has an input-side engaged portion 113 and an output-side engaged portion 114. The input-side engaged portion 113 is configured by a hole that penetrates in the axial direction through a central portion in the radial direction of the engaging element 105. The input-side engaged portion 113 has a size such that the input-side engaging portion 107 may be loosely inserted therein. Therefore, the input-side engaging portion 107 is able to displace in the direction of rotation of the input member 102 with respect to the input-side engaged portion 113 of the engaging element 105, and the input-side engaged portion 113 of the engaging element 105 is able to displace in the radial direction of the engaging element 105 with respect to the input-side engaging portion 107. The output-side engaged portion 114 is configured by a rectangular concave portion that is recessed outward in the radial direction from a central portion in the width direction of the bottom surface 112 of the engaging element 105. The output-side engaged portion 114 has a size such that a front-half portion in the minor axis direction of the output-side engaging portion 109 can be arranged on the inner side thereof.

In the assembled state of the reverse-input blocking clutch 101, the pair of input-side engaging portions 107 of the input member 102 that is arranged on the one side in the axial direction is inserted in the axial direction into the input-side engaged portions 113 of the pair of engaging elements 105, and the output-side engaging portion 109 of the output member 103 that is arranged on the other side in the axial direction is inserted in the axial direction between the pair of output-side engaged portions 114. In other words, the pair of engaging elements 105 is arranged so that the output-side engaged portions 114 sandwich the output-side engaging portion 109 from the outer sides in the radial direction.

As illustrated in FIG. 27, when a rotational torque is inputted to the input member 102 from the input-side mechanism, the input-side engaging portions 107 rotate on the inner side of the input-side engaged portions 113 in the direction of rotation of the input member 102 (clockwise direction in the example in FIG. 27). When this occurs, the inner side surfaces in the radial direction of the input-side engaging portions 107 press the inner surfaces of the input-side engaged portions 113 inward in the radial direction, which causes the pair of engaging elements 105 to move in directions away from the pressed surface 110. As a result, the pair of output-side engaged portions 114 sandwiches the output-side engaging portion 109 of the output member 103 from both sides in the radial direction, and the output-side engaging portion 109 and the pair of output-side engaged portions 114 engage with no looseness. As a result, rotational torque that is inputted to the input member 102 is transmitted to the output member 103 through the pair of engaging elements 105 and outputted from the output member 103.

On the other hand, as illustrated in FIG. 28, when rotational torque is reversely inputted to the output member 103 from an output-side mechanism, the output-side engaging portion 109 rotates on the inner side of the pair of output-side engaged portions 114 in the direction of rotation of the output member 103 (clockwise direction in the example in FIG. 28). When this occurs, corner portions of the output-side engaging portion 109 press the bottom surfaces of the output-side engaged portions 114 outward in the radial direction, which causes each of the pair of engaging elements 105 to move toward the pressed surface 110. As a result, the pressing surfaces 111 of the pair of engaging elements 105 are pressed against the pressed surface 110 of the pressed member 104. As a result, rotational torque that is reversely inputted to the output member 103 is transmitted to the pressed member 104 that is fixed to another member (not illustrated) and completely blocked and not transmitted to the input member 102, or only a part of the rotational torque reversely inputted to the output member 103 is transmitted to the input member 102 and the remaining part is blocked.

In order that rotational torque that is reversely inputted to the output member 103 is completely blocked so as not to be transmitted to the input member 102, the output member 103 is locked by wedging the pair of engaging elements 105 between the output-side engaging portion 109 and the pressed member 104 so that the pressing surfaces 111 do not slide with respect to (rotate relative to) the pressed surface 110. On the other hand, in order that only a part of rotational torque that is reversely inputted to the output member 103 is transmitted to the input member 102 and the remaining portion is blocked, the output member 103 is semi-locked by wedging the pair of engaging elements 105 between the output-side engaging portion 109 and the pressed member 104 so that the pressing surfaces 111 slide with respect to the pressed surface 110. In a state in which the output member 103 is semi-locked and rotational torque is further reversely inputted to the output member 103, the pair of engaging elements 105, due to the engagement between the output-side engaging portion 109 and the output-side engaged portions 114, rotate around the center of rotation of the output member 103 while allowing the pressing surfaces 111 to slide with respect to the pressed surface 110. When the pair of engaging elements 105 rotate, the inner surfaces of the input-side engaged portion 113 press the inner side surfaces in the radial direction of the input-side engaging portions 107 in the circumferential direction (direction of rotation), and part of the rotational torque is transmitted to the input member 102.

CITATION LIST

Patent Literature

Patent Literature 1: WO 2019/026794

SUMMARY OF INVENTION

Technical Problem

In the case of the conventional reverse-input blocking clutch 101 described above, there is room for improvement from the aspect of smoothly switching from a locked or semi-locked state as illustrated in FIG. 28 to an unlocked state as illustrated in FIG. 27 as rotational torque is inputted to the input member 102.

In the conventional construction, as illustrated in FIG. 29, when rotational torque T is inputted to the input member 102 from the locked state or semi-locked state illustrated in FIG. 28, the input-side engaging portions 107 of the input member 102 come in contact with the input-side engaged portions 113 of the engaging elements 105, and translational loads Ft due to the rotational torque T (T=Ft*R) (R is the distance from the center of rotation O of the input member 102 to the area of contact X) act on the areas of contact X between the input-side engaging portions 107 and the input-side engaged portions 113. The directions of the translational loads Ft, or in other words, the directions of the loads acting on the engaging elements 105 from the input member 102 are largely inclined with respect to the radial direction of the engaging elements 105 (directions the engaging elements 105 move when going toward or away from the pressed surface 110), which are directions in which the engaging elements 105 move when switching from the locked state or semi-locked state to the unlocked state. From the aspect of smoothly performing switching from the locked state or semi-locked state to the unlocked state, it is preferable that the directions of the loads acting on the engaging elements 105 from the input member 102 are mostly parallel with the radial direction of the engaging elements 105.

Moreover, a reverse-input blocking clutch may be used by being installed in various kinds of mechanical devices; however, in a case of being installed in a position adjustment device of a machining table or the like, an input-side mechanism such as an electric motor as a rotational drive source is connected to the input member. In such a case, by controlling the input-side mechanism (for example, controlling rotation or controlling torque), operation of the device in which the reverse-input blocking clutch is installed may be controlled. Therefore, depending on the use of the device in which the reverse-input blocking clutch is installed, a reverse-input blocking clutch is desired that will prevent the control of the input-side mechanism from becoming complicated, and will not allow a decline in the controllability of the input-side mechanism.

In order to solve the problems described above, an object of the present invention is to provide a reverse-input blocking clutch that will not allow a decline in the controllability of an input-side mechanism that rotates and drives an input member, and that will make it possible to smoothly switch from a locked state or semi-locked state to an unlocked state when rotational torque is inputted to the input member.

Solution to Problem

The reverse-input blocking clutch according to one aspect of the present invention includes: a pressed member, an input member, an output member, an engaging element, and an elastic body.

The pressed member has a pressed surface around an inner peripheral surface thereof.

The input member is coaxially arranged with the pressed surface and has an input-side engaging portion arranged on an inner side in a radial direction of the pressed surface.

The output member is coaxially arranged with the pressed surface and has an output-side engaging portion on the inner side in the radial direction of the pressed surface arranged further on the inner side in the radial direction than the input-side engaging portion.

The engaging element has a main engaging element body and a link member, and is arranged on the inner side in the radial direction of the pressed surface so as to be able to move in a first direction as a direction away from or toward the pressed surface.

The elastic body is arranged between the main engaging element body and the link member, and applies an elastic force to the link member in a direction toward the pressed surface in the first direction.

The main engaging element body has a pressing surface that faces the pressed surface, a pivot-supporting portion located on a side nearer to the pressed surface than the input-side engaging portion in the first direction, and an output-side engaged portion that engages with the output-side engaging portion.

The link member has a first end portion that is pivotally linked to the pivot-supporting portion, and a second end portion that is pivotally linked to the input-side engaging portion.

The second end portion has an input-side engaged portion into which the input-side engaging portion can be loosely inserted, and in a neutral state in which rotational torque is not inputted to either the input member or the output member, an inner surface of the input-side engaged portion is pressed against an outer surface of the input-side engaging portion by elastic force of the elastic body.

The engaging element, by the pivot-supporting portion being pulled by the input-side engaging portion through the link member when a rotational torque is inputted to the input member, displaces so as to move away from the pressed surface, and by causing the output-side engaged portion to engage with the output-side engaging portion, transmits the rotational torque inputted to the input member to the output member; and when rotational torque is reversely inputted to the output member, by pressing the pressing surface against the pressed surface due to engagement between the output-side engaging portion and the output-side engaged portion, causes the pressing surface to frictionally engage with the pressed surface.

According to one aspect of the present invention, elastic force of the elastic body is able to press a portion of the inner surface of the input-side engaged portion located on the far side from the pressed surface in the first direction against the outer surface of the input-side engaging portion located on the far side from the pressed surface in the first direction.

According to one aspect of the present invention, it is possible to not fasten the elastic body to either the link member or the main engaging element body, and to elastically hold the elastic body between the link member and the main engaging element body.

Alternatively, according to one aspect of the present invention, it is possible to fasten the elastic body to at least one of the link member and the main engaging element body.

According to one aspect of the present invention, it is possible for at least one of the link member and the main engaging element body to have a seating surface for stabilizing the contact position of the elastic body in a portion that comes in contact with the elastic body.

According to one aspect of the present invention, it is possible for the elastic body to include a pair of elastic bodies. In this case, the pair of elastic bodies can be arranged on both sides of the link member in a second direction orthogonal to both the first direction and the axial direction of the pressed surface. Note that the engaging element may include a pair of engaging elements or may include three or more engaging elements; and, in these cases, it is possible for the elastic body to include a pair of elastic bodies for each engaging element.

According to one aspect of the present invention, the elastic force applied to the link member from each elastic body of the pair of elastic bodies may have a component in a direction toward the pressed surface in the first direction, and may have a component in a direction toward the input-side engaging portion in the second direction.

In this case, of the elastic force applied to the link member from each elastic body of the pair of elastic bodies, the components in directions toward the input-side engaging portion in the second direction may cancel each other out.

According to one aspect of the present invention, the main engaging element body may include: a pair of main body plates that are coupled together and arranged so as to overlap in the axial direction of the pressed surface; and a pivot-support shaft, with both side portions in the axial direction of the pivot-support shaft being supported by the pair of main body plates.

In this case, the pair of main body plates may have the pressing surface and the output-side engaged portion, the pivot-supporting portion may be configured by the pivot-support shaft, the link member may be arranged between the pair of main body plates, and in the first end portion, may have a support hole into which the pivot-support shaft can be loosely inserted. In a neutral state in which rotational torque is not inputted to either the input member or the output member, there may be a gap around the entire circumference between the inner surface of the support hole and the pivot-support shaft.

According to one aspect of the present invention, the main engaging element body may further have a pair of intermediate plates held between the pair of main body plates.

The pair of intermediate plates may be arranged in a portion between the pair of main body plates on both side portions in the second direction orthogonal to both the first direction and the axial direction of the pressed surface.

The pivot-support shaft may be supported in an intermediate portion of the pair of main body plates in the second direction, and the link member may be pivotally arranged in an intermediate portion in the second direction of a portion between the pair of main body plates.

According to one aspect of the present invention, the input-side engaging portion may include a pair of input-side engaging portions, and the engaging element may include a pair of engaging elements, wherein the pair of input-side engaging portions and the pair of engaging elements may be arranged so as to sandwich the output-side engaging portion from both sides in the radial direction.

In this case, a biasing member may be further provided so as to be arranged in a location separated from the output-side engaging portion in the second direction orthogonal to both the first direction and the axial direction of the pressed surface, and may elastically span between the pair of engaging elements.

According to one aspect of the present invention, the elastic body may include a coil spring, a leaf spring, a disc spring or the like.

Alternatively, according to one aspect of the present invention, the elastic body may be formed of rubber (for example, silicone rubber).

Advantageous Effects of Invention

With the reverse-input blocking clutch according to an aspect of the present invention, it is possible to smoothly switch from a locked state or semi-locked state to an unlocked state when rotational torque is inputted to the input member, and without a reduction in controllability of the input-side mechanism for driving the input member.

BRIEF DESCRIPTION OF DRAWINGS

FIG. 12A illustrates a state before rotational torque is inputted to the input member, and FIG. 12B illustrates a state after rotational torque is inputted to the input member.

FIG. 19A (b) is a view illustrating a state after rotational torque has been inputted to the input member from the state illustrated in FIG. 19A (a); FIG. 19B (b) is a view illustrating a state after rotational torque has been inputted to the input member from the state illustrated in FIG. 19B (a).

DESCRIPTION OF EMBODIMENTS

First Example

Figure 1:
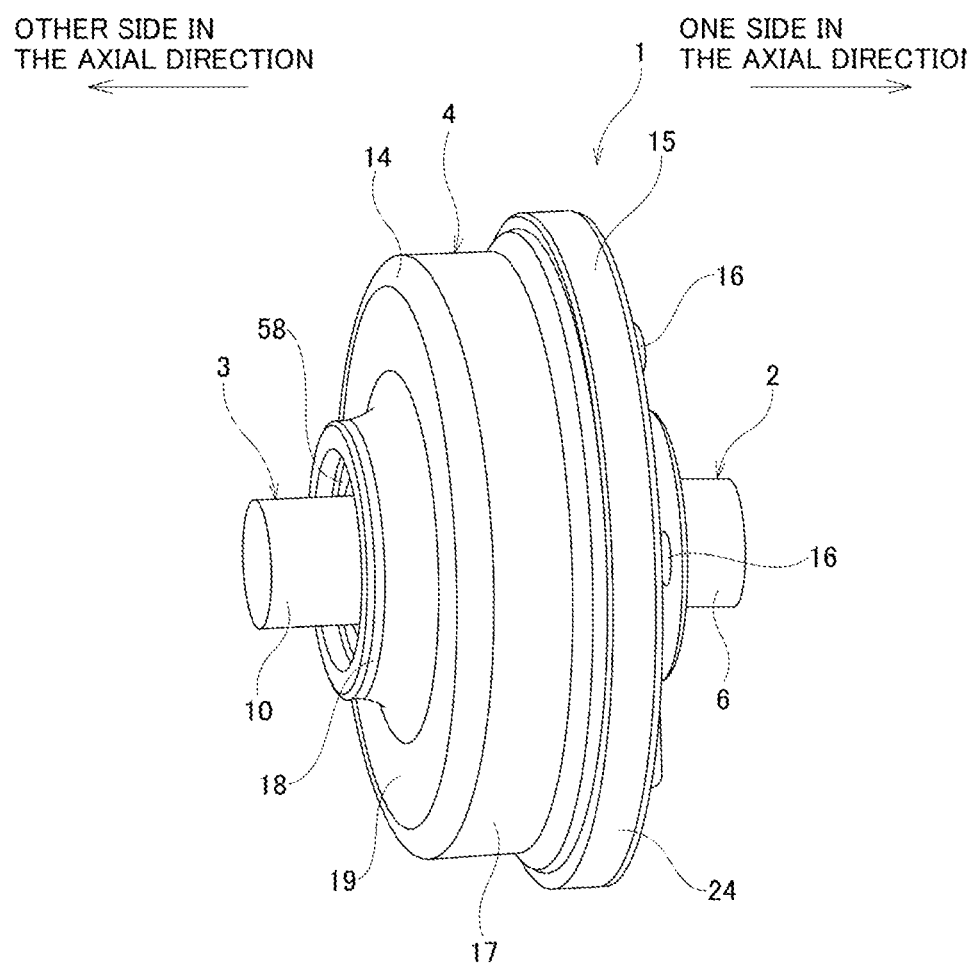
FIG. 1 is a perspective view of a reverse-input blocking clutch of a first example of an embodiment of the present invention.
Figure 2:
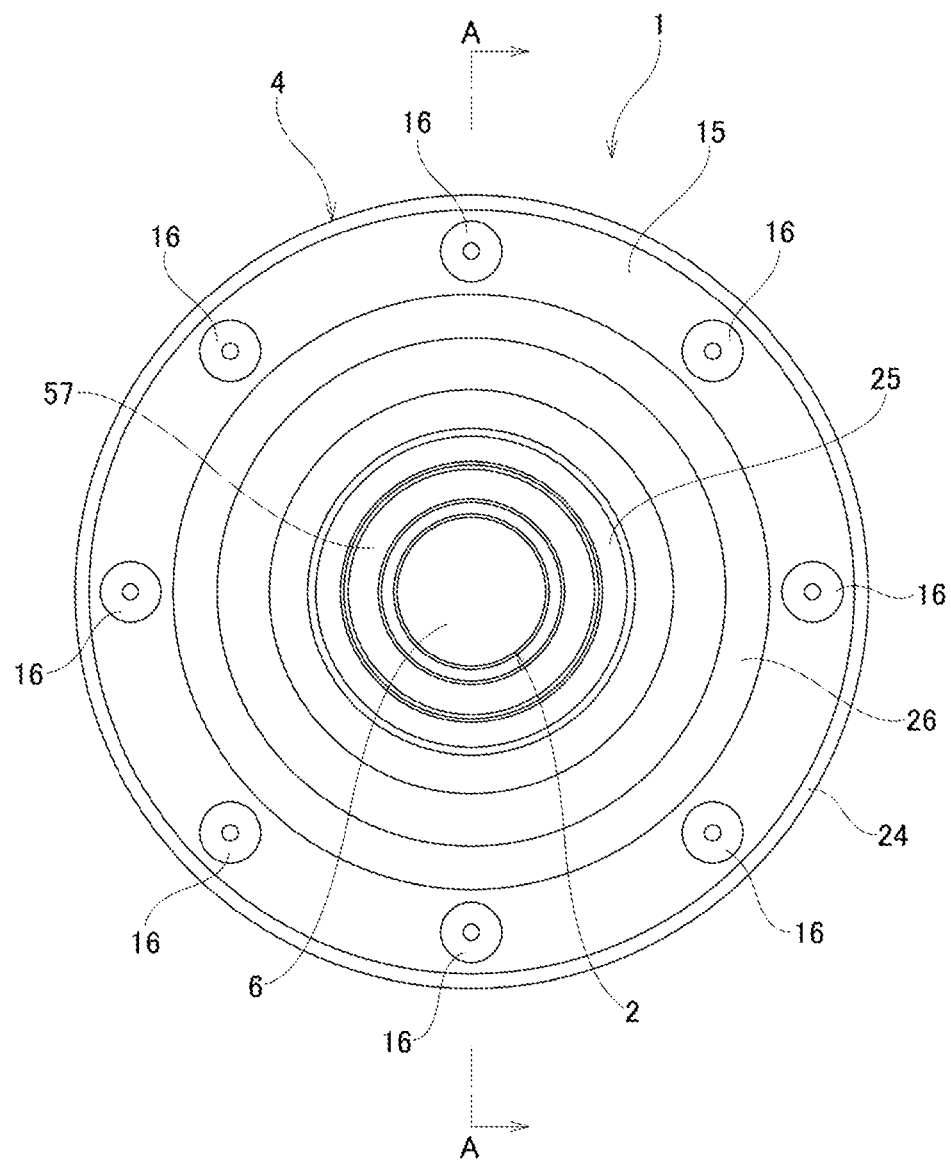
FIG. 2 is a view of the reverse-input blocking clutch of the first example as viewed in the axial direction from the right in FIG. 1.

A first example of an embodiment of the present invention will be described using FIG. 1 to FIG. 20. In the description below, the axial direction, the radial direction, and the circumferential direction, unless stated otherwise, refer to the axial direction, the radial direction, and the circumferential direction of a reverse-input blocking clutch 1. In this example, the axial direction, the radial direction, and the circumferential direction of the reverse-input blocking clutch 1 coincides with the axial direction, the radial direction, and the circumferential direction of an input member 2 and coincides with the axial direction, the radial direction, and the circumferential direction of an output member 3. In the case of the reverse-input blocking clutch 1, one side in the axial direction is the right side in FIG. 1, FIG. 3, FIG. 4, FIG. 9, FIG. 13, and FIG. 15 to FIG. 18, and the other side in the axial direction is the left side in FIG. 1, FIG. 3, FIG. 4, FIG. 9, FIG. 13, and FIG. 15 to FIG. 18.

[Construction of Reverse-Input Blocking Clutch]

The reverse-input blocking clutch 1 of this example includes an input member 2, an output member 3, a housing 4 as a pressed member, an engaging element 5, an elastic body 56, and a biasing member 61. The reverse-input blocking clutch 1 has a reverse input blocking function that transmits rotational torque that is inputted to the input member 2 to the output member 3; however, completely blocks rotational torque that is inputted to the output member 3 and does not transmit the rotational torque to the input member 2, or transmits a part of the rotational torque to the input member 2 and blocks the remaining part.

(Input Member)

Figure 3:
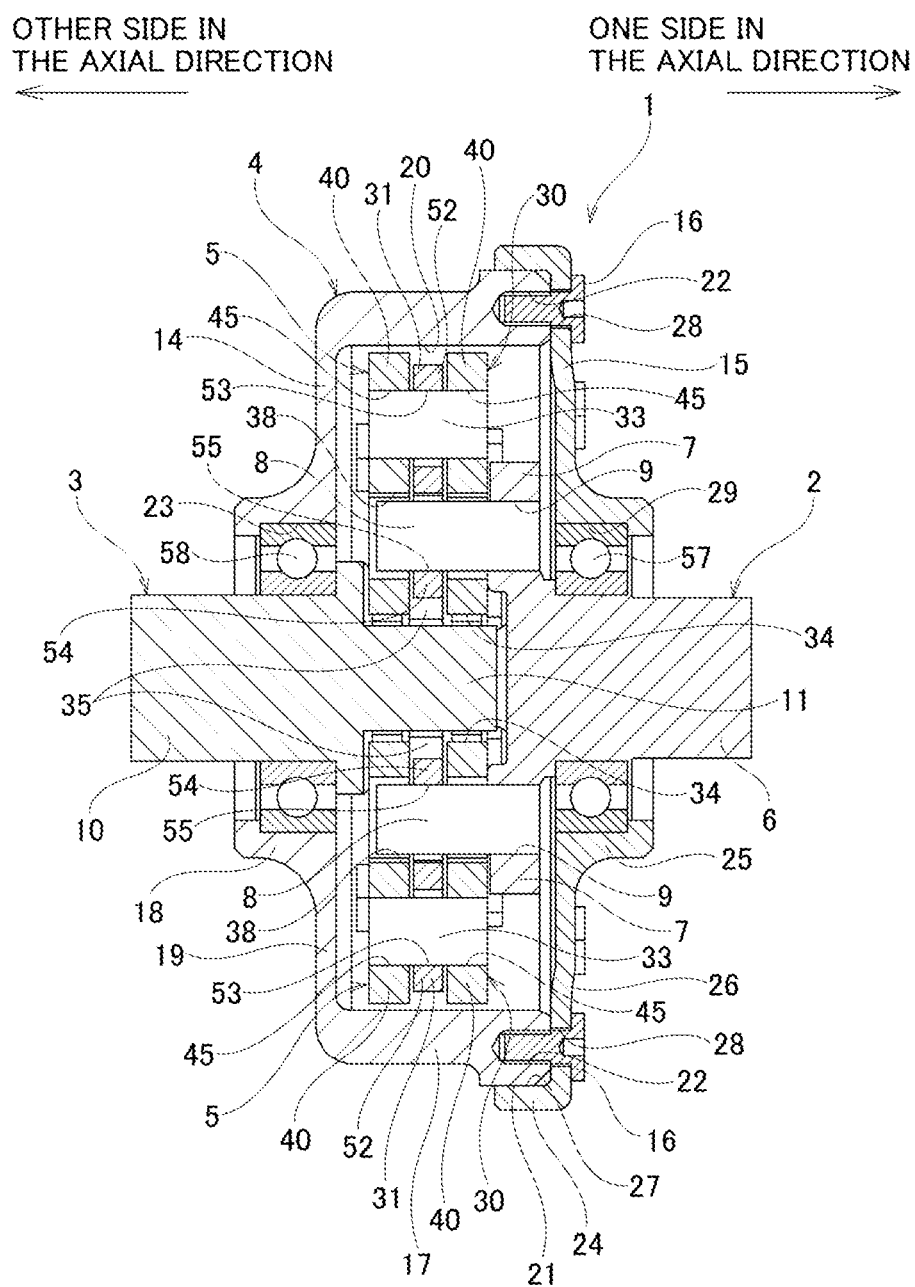
FIG. 3 is a cross-sectional view of section A-A in FIG. 2.
Figure 4:
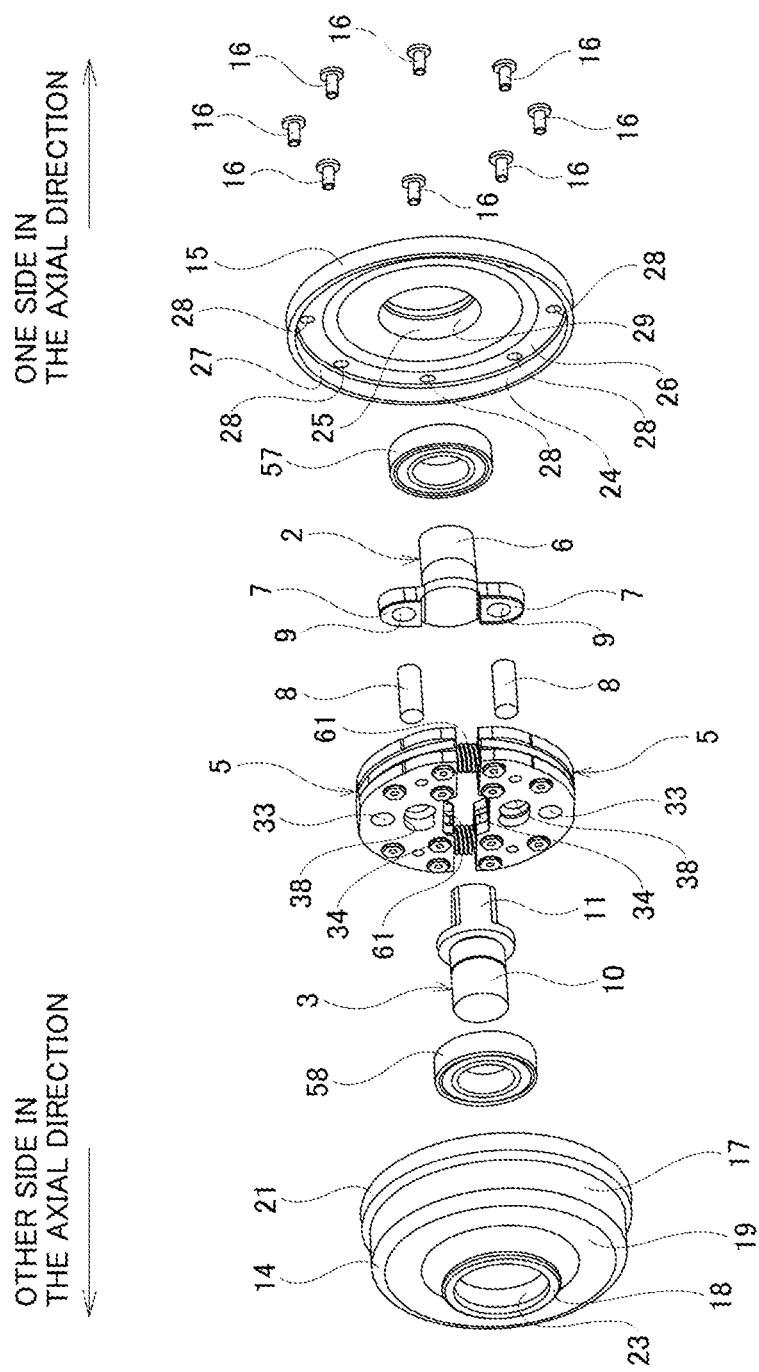
FIG. 4 is an exploded perspective view of the reverse-input blocking clutch of the first example.
Figure 5:
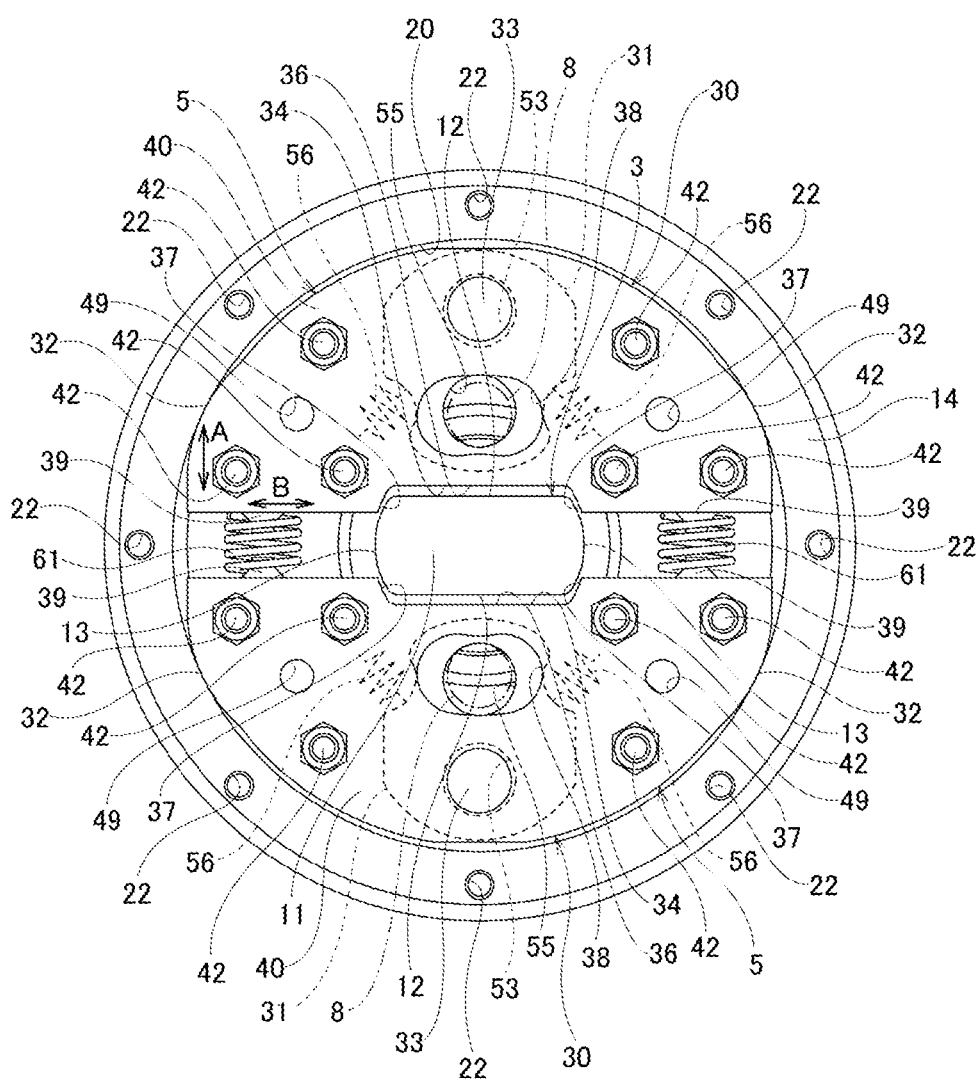
FIG. 5 is a view of the reverse-input blocking clutch illustrated in FIG. 3 and illustrates a state in which an input member, an input-side housing element and input-side bearing are removed, and as viewed from the right side in FIG. 3, illustrates a neutral state in which a rotational torque is not reversely inputted to an output member.

The input member 2 is connected to an input-side mechanism such as an electric motor or the like, and rotational torque is inputted to the input member 2. The input member 2, as illustrated in FIG. 3 and FIG. 4, has an input-shaft portion 6, input-arm portions 7, and input-side engaging portions 8. The input-shaft portion 6 has a columnar shape, and an end portion on the one side in the axial direction of the input-shaft portion 6 is connected to an output portion of the input-side mechanism. In the reverse-input blocking clutch 1 of this example, the input-arm portions 7 are configured by a pair of input-arm portions 7. The pair of input-arm portions 7 extend from an end portion on the other side in the axial direction of the input-shaft portion 6 toward opposite sides in the radial direction from each other, and each input-arm portion 7 has a fitting hole 9 that is a through hole that penetrates in the axial direction through the central portion in the radial direction. The input-side engaging portions 8 are configured by a pair of input-side engaging portions 8. Each of the pair of input-side engaging portions 8 is configured by a columnar shaped pin, and the end portions on the one side in the axial direction of the input-side engaging portions 8 are pressure fitted and fixed inside the fitting holes 9 of the pair of input-arm portions 7. In this state, the pair of input-side engaging portions 8 extend toward the other side in the axial direction from the pair of input-arm portions 7. Note that the entire input member can also be integrally configured as a single body (as a single part). Note that in this example, corresponding to the number of engaging elements 5 (described later) (two engaging elements forming a pair of engaging elements), the input-arm portions 7 and the input-side engaging portions 8 are configured by a pair of input-arm portions 7 and a pair of input-side engaging portions 8. However, in a case of implementing the present invention, the number of input-arm portions and input-side engaging portions is not limited to two, and corresponding to the number of engaging elements, the number of input-arm portions and input-side engaging portions could also be one, or three or more.

(Output Member)

The output member 3 is connected to an output-side mechanism such as a speed-reducing mechanism or the like, and outputs rotational torque. The output member 3 is coaxially arranged with the input member 2, and as illustrated in FIG. 3 and FIG. 4, has an output-shaft portion 10 and an output-side engaging portion 11. The output-shaft portion 10 is formed into a columnar shape. The end portion on the other side in the axial direction of the output-shaft portion 10 is connected to an input portion of the output-side mechanism. The output-side engaging portion 11 is formed into an oblong columnar shape, and extends toward the one side in the axial direction from a central portion of the end surface of the one side in the axial direction of the output-shaft portion 10. The outer peripheral surface of the output-side engaging portion 11, as illustrated in FIG. 5, FIG. 6, FIG. 20A and FIG. 20B, has side surfaces 12 on both sides in the minor axis direction (vertical direction in FIG. 5, FIG. 6, FIG. 20A and FIG. 20B), and a pair of guide surfaces 13 as the side surfaces on both sides in the major axis direction (horizontal direction in FIG. 5, FIG. 6, FIG. 20A and FIG. 20B).

Each of the pair of side surfaces 12 is configured by a flat surface that is orthogonal to the minor axis direction of the output-side engaging portion 11. Each guide surface 13 of the pair of guide surfaces 13 is configured by a convex curved surface. More specifically, each guide surface 13 is configured by a partially cylindrical shaped convex surface that is centered on the center axis of the output-side engaging portion 11 (center axis of the output member 3). Therefore, regarding the output member 3, the outer peripheral surface of a round bar material, for example, can be used for the pair of guide surfaces 13, and the processing cost can be suppressed accordingly. However, in a case of implementing the present invention, the convex curved surfaces of the pair of guide surfaces may be partially cylindrical shaped convex surfaces centered on an axis parallel to the center axis of the output member 3, or may be non-cylindrical shaped convex surfaces such as partially elliptical shaped convex surfaces or the like. Moreover, in this example, the output-shaft portion 10 and the output-side engaging portion 11 are integrally manufactured; however, in a case of implementing the present invention, an output-shaft portion and an output-side engaging portion that are separately manufactured from each other may be coupled and fixed together. The output-side engaging portion 11 is arranged further on the inner side in the radial direction than the pair of input-side engaging portions 8, and more specifically, is arranged in a portion between the pair of input-side engaging portions 8.

(Housing)

The housing 4, as illustrated in FIG. 1 to FIG. 4, is formed into a hollow circular disk shape, is fixed to another member (not illustrated) and the rotation of the housing 4 is restricted. The housing 4 is coaxially arranged with the input member 2 and the output member 3, and houses the input-side engaging portions 8, the output-side engaging portion 11, the engaging elements 5, biasing members 61 and the like on the inner side thereof. The housing 4 is configured by coupling together an output-side housing element (main housing body) 14 arranged on the other side in the axial direction and an input-side housing element (housing cover) 15 arranged on the one side in the axial direction by a plurality of bolts 16.

The output-side housing element 14 includes an outer-diameter-side tubular portion 17, an inner-diameter-side tubular portion 18, and a side plate portion 19. The outer-diameter-side tubular portion 17 is formed into a cylindrical shape. The inner-diameter-side tubular portion 18 is formed into a cylindrical shape that is coaxially arranged with the outer-diameter-side tubular portion 17 on the other side in the axial direction of the outer-diameter-side tubular portion 17. The side plate portion 19 is formed into an annular plate shape, and an end portion on the outer side in the radial direction of the side plate portion 19 is coupled with an end portion on the other side in the axial direction of the outer-diameter-side tubular portion 17, and an end portion on the inner side in the radial direction of the side plate portion 19 is coupled with an end portion on the one side in the axial direction of the inner-diameter-side tubular portion 18.

The outer-diameter-side tubular portion 17 has a pressed surface 20 around the inner peripheral surface thereof. The pressed surface 20 is configured by a cylindrical surface centered on the center axis of the output-side housing element 14. The outer-diameter-side tubular portion 17 has an output-side in-row fitting surface 21 around the outer peripheral surface of the end portion on the one side in the axial direction having an outer-diameter dimension that is larger than that of the outer peripheral surface of a portion adjacent on the other side in the axial direction. The output-side in-row fitting surface 21 is configured by a cylindrical surface centered on the center axis of the output-side housing element 14. The outer-diameter-side tubular portion 17 has screw holes 22 at a plurality of locations (eight locations in the illustrated example) that are evenly spaced in the circumferential direction in the end portion on the one side in the axial direction, and that open to the one side in the axial direction. The inner-diameter-side tubular portion 18 has an output-side bearing fitting surface 23 along a portion from the end portion to an intermediate portion on the one side in the axial direction of the inner peripheral surface. The output-side bearing fitting surface 23 is configured by a cylindrical surface centered on the center axis of the output-side housing element 14. In other words, the pressed surface 20, the output-side in-row fitting surface 21, and the output-side bearing fitting surface 23 are coaxially arranged with each other.

The input-side housing element 15 includes an outer-diameter-side tubular portion 24, an inner-diameter-side tubular portion 25, and a side plate portion 26. The outer-diameter-side tubular portion 24 is formed into a cylindrical shape. The inner-diameter-side tubular portion 25 is formed into a cylindrical shape that is coaxially arranged with the outer-diameter-side tubular portion 24 on the one side in the axial direction of the outer-diameter-side tubular portion 24. The side plate portion 26 is formed into an annular plate shape, and an end portion on the outer side in the radial direction of the side plate portion 26 is coupled with an end portion on the one side in the axial direction of the outer-diameter-side tubular portion 24, and an end portion on the inner side in the radial direction of the side plate portion 26 is coupled with an end portion on the other side in the axial direction of the inner-diameter-side tubular portion 25.

The outer-diameter-side tubular portion 24 has an input-side in-row fitting surface 27 around the inner peripheral surface. The input-side in-row fitting surface 27 is configured by a cylindrical surface centered on the center axis of the input-side housing element 15. The input-side in-row fitting surface 27 has an inner-diameter dimension capable of fitting with the output-side in-row fitting surface 21 of the output-side housing element 14 without looseness. The side plate portion 26 has through holes 28 at a plurality of locations evenly spaced in the circumferential direction in the end portion on the outer side in the radial direction and aligned with the screw holes 22 of the output-side housing element 14. The inner-diameter-side tubular portion 25 has an input-side bearing fitting surface 29 along a portion from the end portion to an intermediate portion on the other side in the axial direction of the inner peripheral surface. The input-side bearing fitting surface 29 is configured by a cylindrical surface centered on the center axis of the input-side housing element 15. In other words, the input-side in-row fitting surface 27 and the input-side bearing fitting surface 29 are coaxially arranged with each other.

The housing 4 is assembled by coupling and fixing the output-side housing element 14 and the input-side housing element 15 together by fitting the input-side in-row fitting surface 27 of the input-side housing element 15 with the output-side in-row fitting surface 21 of the output-side housing element 14 so there is no looseness, and screwing the bolts 16 that are inserted through the through holes 28 of the input-side housing element 15 into the screw holes 22 of the output-side housing element 14 and further tightening. In this example, the output-side in-row fitting surface 21 and the output-side bearing fitting surface 23 of the output-side housing element 14 are coaxially arranged with each other, and the input-side in-row fitting surface 27 and the input-side bearing fitting surface 29 of the input-side housing element 15 are coaxially arranged with each other. Therefore, in the assembled state of the housing 4 in which the output-side in-row fitting surface 21 is fitted without looseness with the input-side in-row fitting surface 27, the input-side bearing fitting surface 29 and the output-side bearing fitting surface 23 are coaxially arranged with each other.

In the assembled state of the housing 4, the input-shaft portion 6 of the input member 2 is rotatably supported by an input-side bearing 57 so as to be able to rotate with respect to the input-side bearing fitting surface 29 of the input-side housing element 15. Moreover, the output-shaft portion 10 of the output member 3 is rotatably supported by an output-side bearing 58 so as to be able to rotate with respect to the output-side bearing fitting surface 23 of the output-side housing element 14. As a result, the input member 2 and the output member 3 are coaxially arranged with each other, and coaxially arranged with the pressed surface 20 of the housing 4. Furthermore, in this state, the pair of input-side engaging portions 8 and the output-side engaging portion 11 are arranged on the inner side in the radial direction of the pressed surface 20 of the housing 4. Note that regarding the reverse-input blocking clutch 1, in a case where it is desired to increase the performance level of switching from a locked state or semi-locked state (described later) to an unlocked state (lock releasing performance) or the like, it is necessary that the coaxiality and inclination of the input member 2 and the output member 3 be strictly managed. In such a case, it is possible to apply methods of common bearing usage such as changing both the input-side bearing 57 and the output-side bearing 58 from single-row rolling bearings as illustrated in the drawings to double-row rolling bearings or the like.

(Engaging Elements)

In the reverse-input blocking clutch 1 of this example, the engaging elements 5 are configured by a pair of engaging elements 5 (two engaging elements 5). The pair of engaging elements 5 is arranged on the inner side in the radial direction of the pressed surface 20. Each of the engaging elements 5 is composed of a plurality of parts including a main engaging element body 30, and a link member 31 that is pivotally linked to the main engaging element body 30. However, in a case of implementing the present invention, the number of engaging elements is not limited to two; for example, by eliminating one of the two engaging elements of the pair of engaging elements, the engaging element may be configured by one engaging element. Alternatively, the engaging elements may be configured by three or more engaging elements.

(Main Engaging Element Body)

The main engaging element body 30, as illustrated in FIG. 13 to FIG. 18, may be configured by combining a plurality of parts. In the following, the construction of the assembled main engaging element body 30 will be described, after which the construction of each part of the main engaging element body 30 will be described.

The main engaging element body 30 has a substantially semi-circular plate shape and includes a pair of pressing surfaces 32 facing the pressed surface 20, a pivot-support shaft 33 as a pivot-supporting portion, and an output-side engaged portion 34 that engages with the output-side engaging portion 11.

In this example, the outer peripheral surface of the main engaging element body 30 is configured by a convex arc-shaped outer-side surface in the radial direction that corresponds to the arc of the main engaging element body 30, and a crank-shaped inner-side surface in the radial direction corresponding to the chord of the main engaging element body 30. Note that the radial direction of the main engaging element body 30 refers to a direction orthogonal to the chord of the main engaging element body 30 indicated by the arrow A in FIG. 5. Moreover, the width direction of the main engaging element body 30 refers to a direction indicated by arrow B in FIG. 5 that is parallel to the chord of the main engaging element body 30. Note that in this example, the radial direction of the main engaging element body 30 is the direction of movement of the main engaging element body 30 of the engaging element 5 when moving away from or toward the pressed surface 20 and corresponds to a first direction. Furthermore, in this example, the width direction of the main engaging element body 30 corresponds to a second direction that is orthogonal to both the first direction and to the axial direction of the pressed surface 20.

In this example, the pair of engaging elements 5 is arranged on the inner side in the radial direction of the pressed surface 20 in a state in which the outer-side surfaces in the radial direction of the main engaging element bodies 30 are faced toward the opposite sides and the inner-side surfaces in the radial direction of the main engaging element bodies 30 are faced toward each other. In a state in which the pair of engaging elements 5 is arranged on the inner side in the radial direction of the pressed surface 20, the inner-diameter dimension of the pressed surface 20 and the dimension in the radial direction of the main engaging element bodies 30 are regulated so that there are gaps in at least portions between the pressed surface 20 and the outer-side surfaces in the radial direction of the main engaging element bodies 30 and a portion between the inner-side surfaces in the radial direction of the main engaging element bodies 30 that allow the main engaging element bodies 30 to move in the radial direction.

Each main engaging element body 30 has a pair of pressing surfaces 32 on the outer-side surface in the radial direction. The pair of pressing surfaces 32, in the locked state or semi-locked state of the output member 3, are portions that are pressed against the pressed surface 20, and are arranged on both side portions in the circumferential direction of the outer-side surface in the radial direction of the main engaging element body 30 so as to be separated in the circumferential direction. Each of the pair of pressing surfaces 32 protrudes further toward the pressed surface 20 than the portions of the outer-side surface in the radial direction of the main engaging element body 30 that are separated from the pressing surface 32 in the circumferential direction. Each of the pair of pressing surfaces 32 is a partial cylindrical shaped convex surface having a radius of curvature that is smaller than the radius of curvature of the pressed surface 20. The portions of the outer-side surface in the radial direction of the main engaging element body 30 that are separated in the circumferential direction from the pair of pressing surfaces 32 (portions that are located between a pair of pressing surfaces 32 in the circumferential direction) are non-contact surfaces that do not come in contact with the pressed surface 20.

The main engaging element body 30 has an internal space 35 in the central portion in the thickness direction (axial direction) of the central portion in the width direction. The end portions on both sides in the radial direction of the internal space 35 are respectively open to the outer-side surface in the radial direction and the inner-side surface in the radial direction of the main engaging element body 30. The main engaging element body 30 has a pivot-support shaft 33 that is arranged in the axial direction, and an intermediate portion in the axial direction of the pivot-support shaft 33 is arranged in an outer-side portion in the radial direction of a central portion in the width direction of the internal space 35. The pivot-support shaft 33 is configured by a columnar shaped pin. The end portions on both sides in the axial direction of the pivot-support shaft 33 are supported by portions of the main engaging element body 30 that sandwich the internal space 35 from both sides in the axial direction.

The main engaging element body 30 has an output-side engaged portion 34 in a central portion in the width direction of the inner-side surface in the radial direction. The output-side engaged portion 34 is configured by a substantially rectangular concave portion that is recessed outward in the radial direction from a central portion in the width direction of the inner side surface in the radial direction of the main engaging element body 30 (side surface on the far side from the pressed surface 20).

Figure 6:
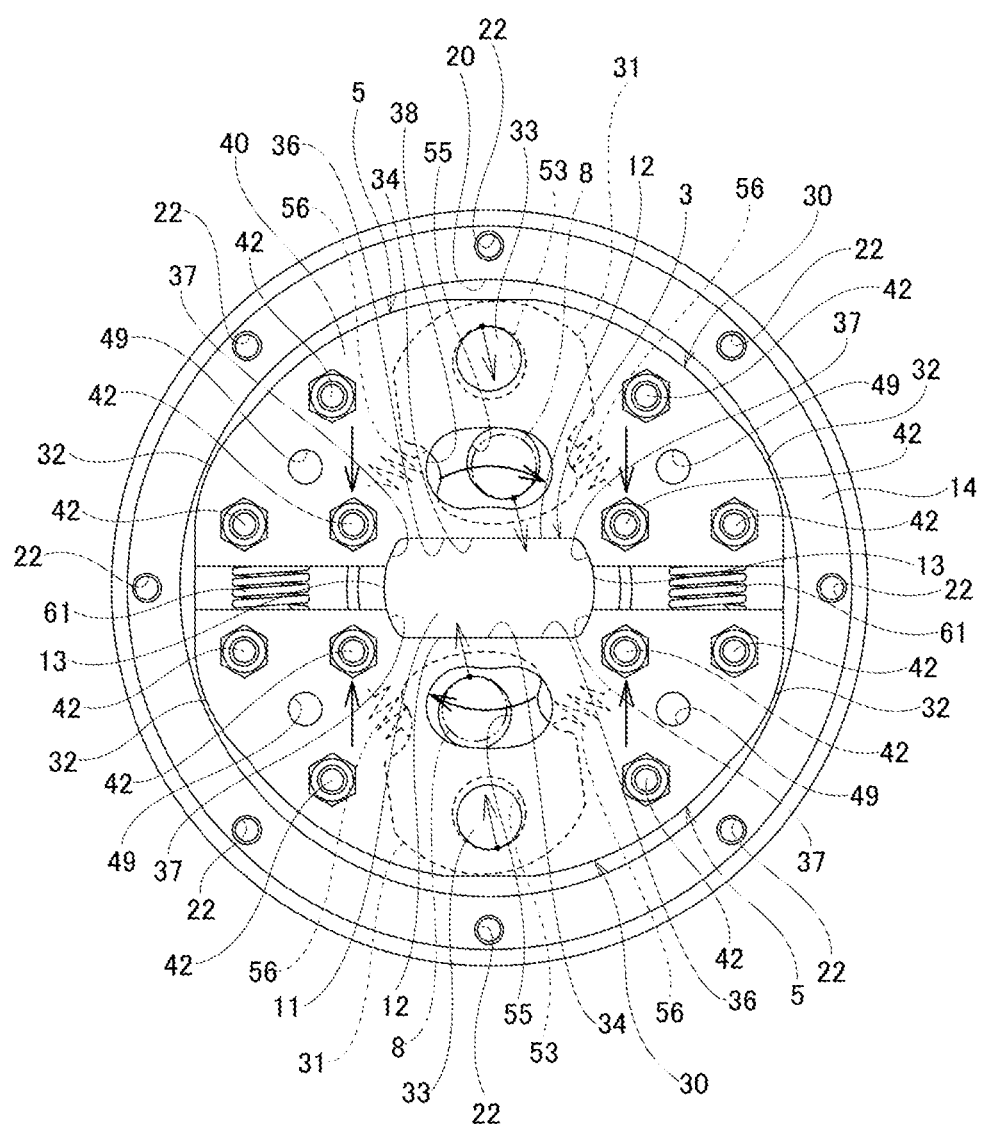
FIG. 6 is a view similar to FIG. 5 and illustrates a state in which a rotational torque is inputted to the input member.

The output-side engaged portion 34, as illustrated in FIG. 5, FIG. 6, FIG. 20A and FIG. 20B, has a size such that the front-half portion in the minor axis direction of the output-side engaging portion 11 can be arranged on the inner side thereof. In particular, in this example, as illustrated in FIG. 6 and FIG. 20B, the output-side engaged portion 34 has an inner-surface shape that coincides with the outer peripheral surface of the front-half portion in the minor axis direction of the output-side engaging portion 11.

The inner surface of the output-side engaged portion 34 has a bottom surface 36 and a pair of guided surfaces 37. The bottom surface 36 is configured by a flat surface that is orthogonal to the radial direction of the main engaging element body 30. Of the inner surface of the output-side engaged portion 34, the pair of guided surfaces 37 are arranged on the end portions on both sides in the width direction of the main engaging element body 30, and face each other in the width direction. The pair of guided surfaces 37 is configured by a pair of concave curved surfaces that are inclined in directions such that the distance between the surfaces increases as going toward the inner side in the radial direction of the main engaging element body 30, or in other words, as going in a direction in the radial direction of the main engaging element body 30 away from the pressed surface 20.

The pair of guided surfaces 37 is able to come in contact with the pair of guide surfaces 13 of the output-side engaging portion 11, and each of the guided surfaces 37 is configured by a partial cylindrical concave surface that has a radius of curvature that is the same as that of each of the guide surfaces 13, or has a radius of curvature that is slightly larger than that of the guide surfaces 13. In other words, in this example, as illustrated in FIG. 6 and FIG. 20B, the output-side engaged portion 34 has an inner-surface shape that coincides with the outer peripheral surface of the front-half portion in the minor axis direction of the output-side engaging portion 11. That is, the bottom surface 36 of the output-side engaged portion 34 can be brought into surface contact with the side surface 12 of the output-side engaging portion 11, and the pair of guided surfaces 37 of the output-side engaged portion 34 can be brought into surface contact with the front-half portion in the minor axis direction of the pair of guide surfaces 13 of the output-side engaging portion 11. Note that in a case of implementing the present invention, each of the guided surfaces may be configured by a non-cylindrical shaped concave surface such as a partial elliptical tubular shape or the like.

The main engaging element body 30 has an insertion hole 38 in an inner-side portion in the radial direction of the central portion in the width direction. The insertion hole 38 is configured by an arc-shaped long hole that penetrates in the axial direction through an inner-side portion in the radial direction of the central portion in the width direction of the main engaging element body 30, and that extends in the circumferential direction. The insertion hole 38 has a size that allows the input-side engaging portion 8 to be loosely inserted therein. More specifically, when the input-side engaging portion 8 is inserted into the inner side of the insertion hole 38, there is a gap in the circumferential direction and a gap in the radial direction of the main engaging element body 30 between the input-side engaging portion 8 and the inner surface of the insertion hole 38. Therefore, the input-side engaging portion 8 is able to displace in the direction of rotation of the input member 2 with respect to the insertion hole 38 of the main engaging element body 30 due to the existence of the gap in the circumferential direction, and the insertion hole 38 of the main engaging element body 30 is able to displace in the radial direction of the main engaging element body 30 with respect to the input-side engaging portion 8 due to the existence of the gap in the radial direction of the main engaging element body 30. In other words, the size of the insertion hole 38 is regulated so that operation is not hindered due to interference between the inner peripheral edge of the insertion hole 38 and the input-side engaging portion 8 during operation of the reverse-input blocking clutch 1 described later.

The main engaging element body 30 is configured by combining a plurality of parts. More specifically, the main engaging element body 30 includes a pair of main body plates 40, a pair of intermediate plates 41, a pivot-support shaft 33, and a plurality of bolts 42 and nuts 43 as coupling members.

The pair of main body plates 40 are parts that form both side portions in the thickness direction of the main engaging element body 30, and are arranged so as to overlap in the axial direction. Each main body plate 40 of the pair of main body plates 40 is a press-molded part that is made by punching a metal plate such as steel plate or the like by press working, and has a substantially semi-circular plate shape. Each of the pair of main body plates 40 has convex surfaces 44 at two locations on the outer-side surface in the radial direction that are separated in the circumferential direction and that form the pressing surfaces 32 in the assembled state of the main engaging element body 30. Each main body plate 40 has a circular installation hole 45 in an outer-side portion in the radial direction of the central portion in the width direction. Each main body plate 40 has a concave portion 46 in the central portion in the width direction of the inner-side surface in the radial direction that, in the assembled state of the main engaging element body 30, forms the output-side engaged portion 34. Therefore, in this example, the pair of concave portions 46 arranged separated from each other in the axial direction form the output-side engaged portion 34. Each main body plate 40 has a through hole 47 in an inner-side portion in the radial direction of the central portion in the width direction that forms the insertion hole 38 in the assembled state of the main engaging element body 30. The main engaging element body 30 has a plurality of through holes 48 (three in the illustrated example) in each of both side portions in the width direction. The main engaging element body 30 has a positioning hole 49 in each of both side portions in the width direction at a location that is separated from the plurality of through holes 48.

The pair of intermediate plates 41 are members that form the intermediate portion in the thickness direction of the main engaging element body 30. Each intermediate plate 41 of the pair of intermediate plates 41 is a press-molded part that is made by punching a metal plate such as steel plate or the like by press working, and has a substantially fan plate shape. The pair of intermediate plates 41 is held between both side portions in the width direction of the pair of main body plates 40. Particularly, the outer-side surface in the radial direction of the intermediate plates 41 is located further on the inner side in the radial direction than the outer-side surfaces in the radial direction of the pair of main body plates 40, and does not come in contact with the pressed surface 20. Each intermediate plate 41 has a convex portion 39 in an intermediate portion in the width direction of the inner-side surface in the radial direction. The convex portion 39 protrudes further toward the inner side in the radial direction than the inner-side surfaces in the radial direction of the pair of main body plates 40. Of the intermediate plate 41, the portions other than the convex portion 39 are arranged between the pair of main body plates 40. Each intermediate plate 41 has an overhang portion 59 on the inner-side portion in the radial direction of the side surface of the central side in the width direction facing the link member 31 and that protrudes in the width direction. Each of the pair of intermediate plates 41 has through holes 50 at a plurality of locations that are aligned with each of the through holes 48 of the pair of main body plates 40. Each of the plurality of intermediate plates 41 has a positioning hole 51 that is aligned with each of the positioning holes 49 of the pair of main body plates 40.

The pair of main body plates 40 and the pair of intermediate plates 41 are coupled and fastened together by screwing nuts 43 onto the tip-end portions of a plurality of bolts 42 that are inserted through the through holes 48 of the pair of main body plates 40 and the through holes 50 of the pair of intermediate plates 41 that are aligned together, and further tightening. Note that in the construction of this example, when performing this kind of coupling and fastening work, it is possible to easily perform the work of aligning the through holes 48 of the pair of main body plates 40 and the through holes 50 of the pair of intermediate plates 41 by inserting positioning rods for the positioning work through the positioning holes 49 of the pair of main body plates 40 and the positioning holes 51 of the pair of intermediate plates 41 that are aligned with each other. In the construction of this example, in a state in which the pair of main body plates 40 and the pair of intermediate plates 41 are coupled and fastened together as described above, internal space 35 is formed between the pair of main body plates 40 and between the pair of intermediate plates 41 in the width direction.

The pivot-support shaft 33 is configured by a columnar shaped pin. The end portions on both sides in the axial direction of the pivot-support shaft 33 are pressure fitted and fixed inside the installation holes 45 of the pair of main body plates 40. The intermediate portion of the pivot-support shaft 33 is arranged inside the internal space 35.

(Link Member)

Figure 17:
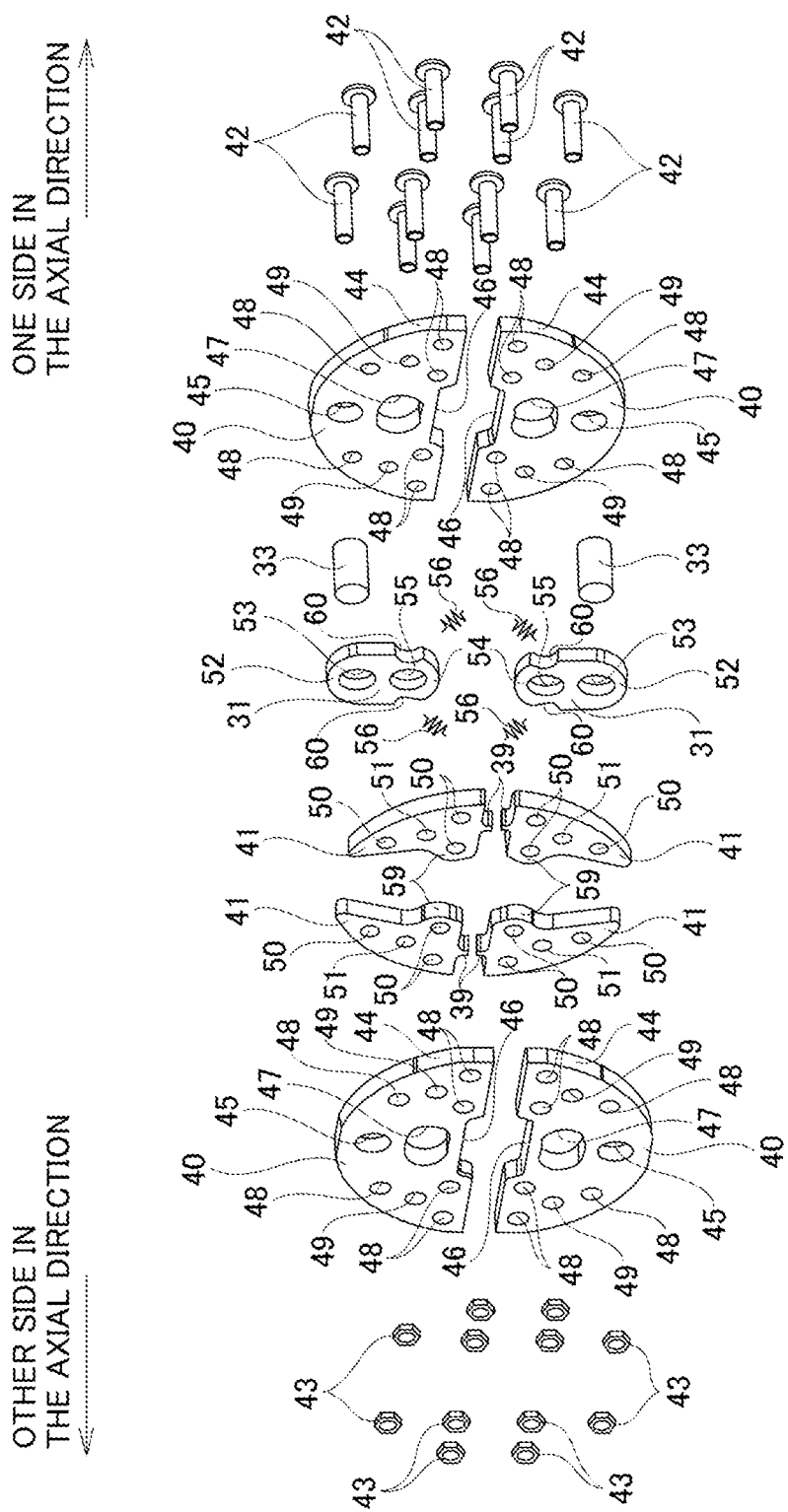
FIG. 17 is an exploded perspective view of the pair of engaging elements of the reverse-input blocking clutch of the first example.
Figure 18:
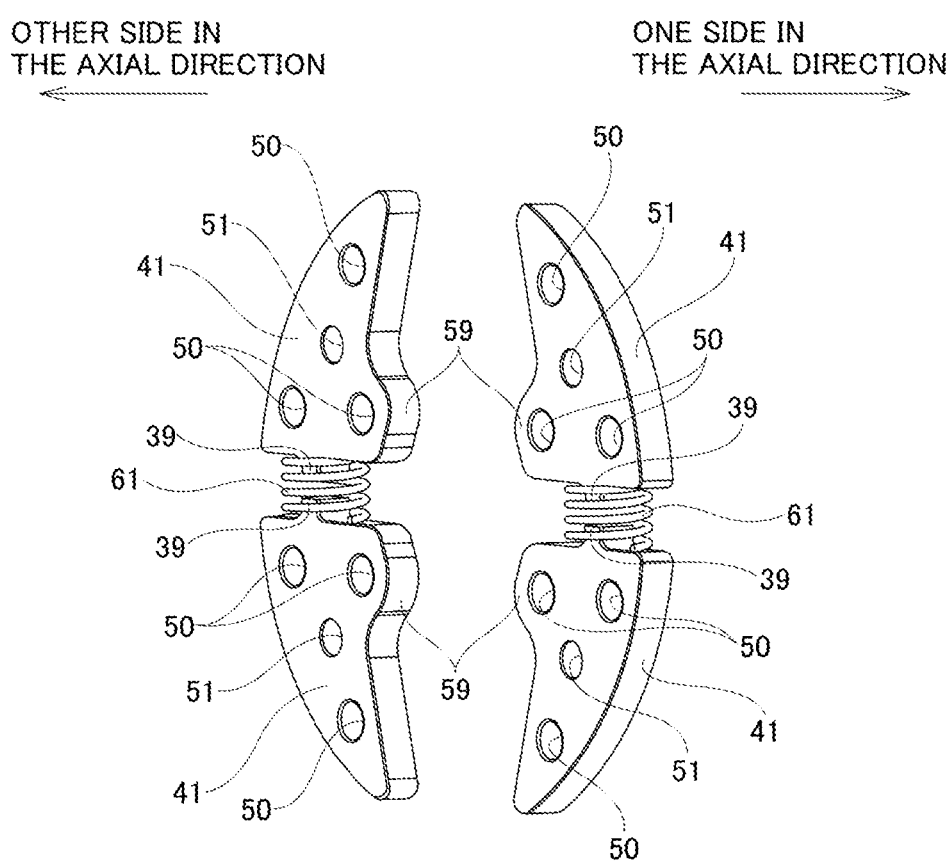
FIG. 18 is a perspective view of the intermediate plates and biasing members of the pair of engaging elements of the reverse-input blocking clutch of the first example.
Figure 19:
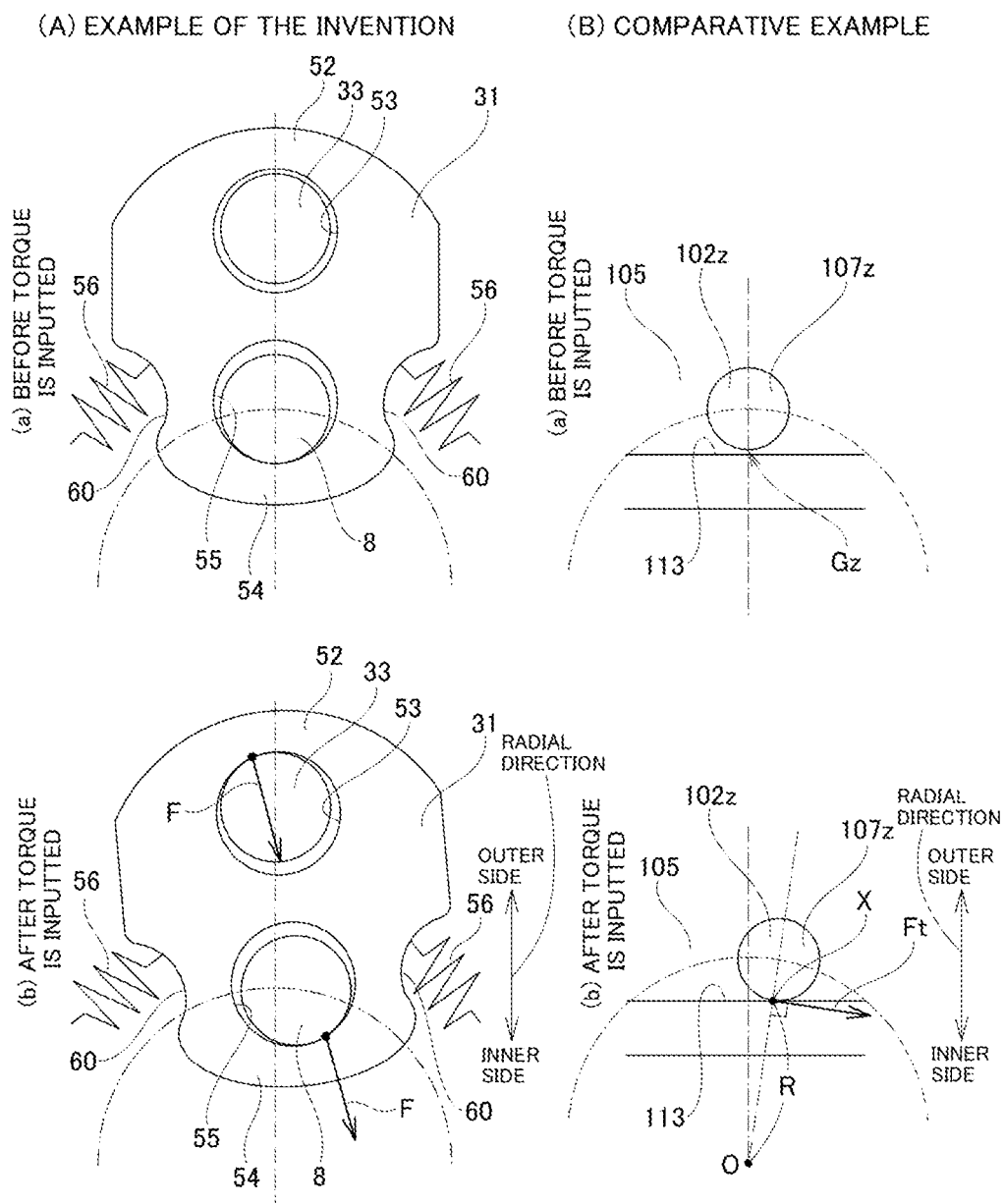
FIG. 19A (a) is a view illustrating the construction of the first example, and illustrates a state before rotational torque is inputted to the input member and the engagement portions between the engaging element and the input-side engaging portion.
FIG. 19B (a) is a view illustrating the construction of a comparative example corresponding to conventional construction, and illustrates a state before rotational torque is inputted to the input member and the engagement portions between the engaging elements and the input-side engaging portions.
Figure 20:
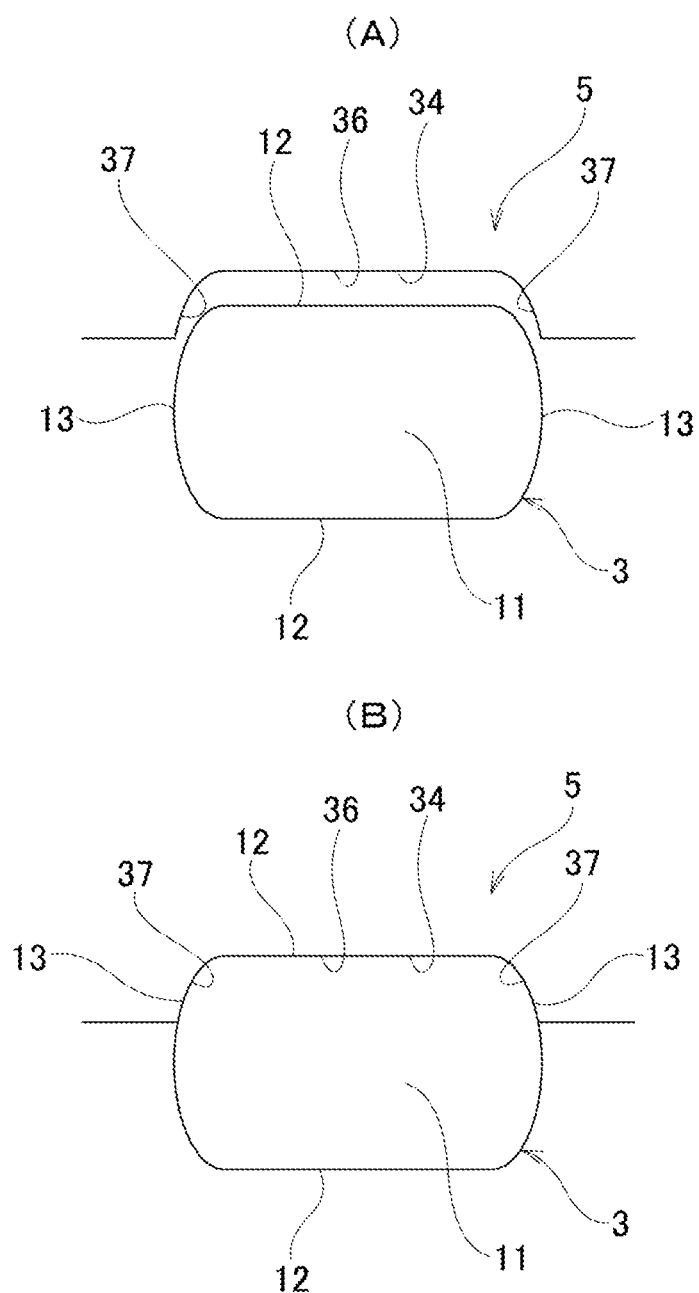
FIG. 20A and FIG. 20B are views illustrating states before and after engagement between the output-side engaging portion and the output-side engaged portion of the reverse-input blocking clutch of the first example.

A link member 31, as illustrated in FIG. 17, is a press-molded part that is made by punching a metal plate such as steel plate or the like by press working, and has a substantially rectangular or substantially oblong plate shape, the intermediate portion in the lengthwise direction being constricted, and is arranged in the internal space 35 of the main engaging element body 30 (between the pair of main body plates 40 and between the pair of intermediate plates 41).

The thickness dimension of the link member 31 is smaller than the width dimension in the axial direction of the internal space 35 (the distance between the side surfaces of the pair of main body plates 40 that face each other, or the thickness dimension of the intermediate plates 41). Of the link member 31, a first end portion 52 that is the end portion on one side in the lengthwise direction of the link member 31 has a support hole 53 that is a circular hole penetrating in the axial direction, and a second end portion 54 that is the end portion on the other side in the lengthwise direction of the link member 31 has an input-side engaged portion 55 that is a circular hole penetrating in the axial direction.

The pivot-support shaft 33 is loosely inserted through the support hole 53. As a result, the first end portion 52 is pivotally linked with the pivot-support shaft 33. The input-side engaging portion 8 is inserted through the input-side engaged portion 55. As a result, the second end portion 54 is pivotally linked with the input-side engaging portion 8.

The link member 31 has a pair of constricted portions 60 in the intermediate portions in the radial direction of the side surfaces in the width direction facing each of the pair of intermediate plates 41. Each of the pair of constricted portions 60 is formed into a concave curved surface.

Figure 10:
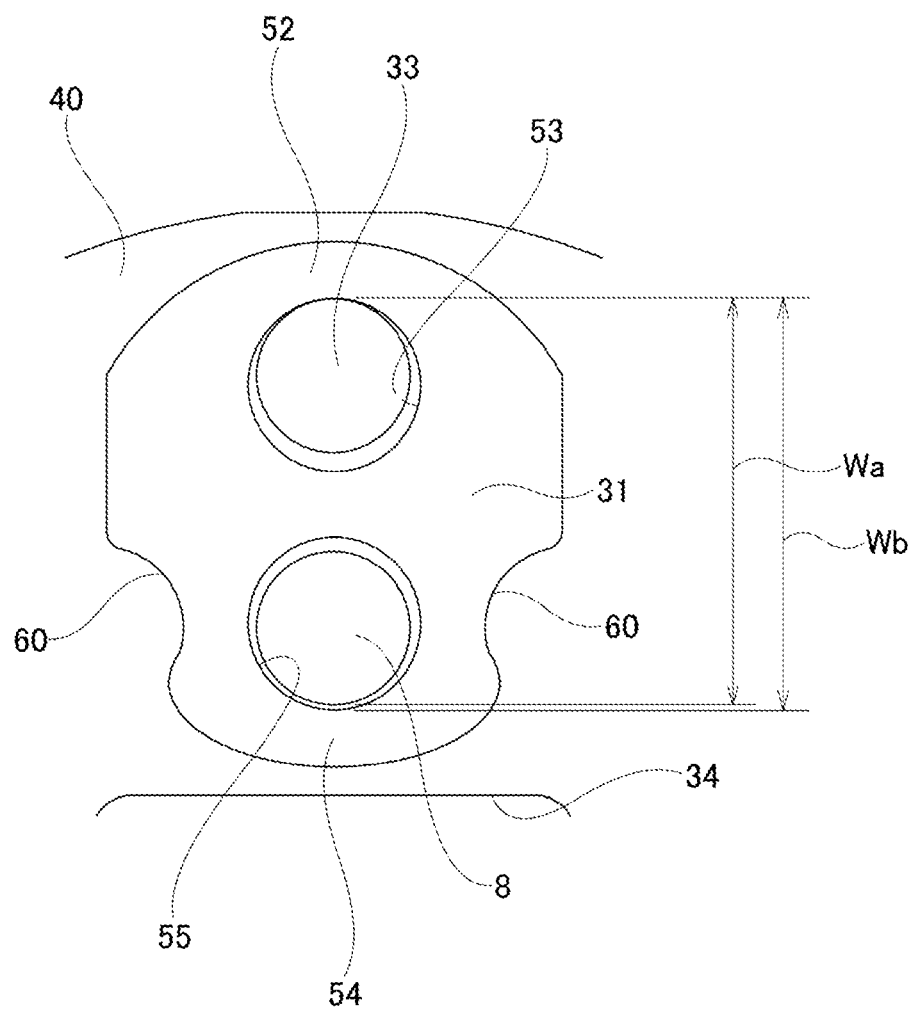
FIG. 10 is an enlarged view of a central portion in the left-right direction of the upper-half portion of FIG. 8 and illustrates a state before a pair of elastic bodies are installed.

The support hole 53 has an inner-diameter dimension that is larger than the outer-diameter dimension of the pivot-support shaft 33 in order that the pivot-support shaft 33 may be loosely inserted inside therein. Moreover, the input-side engaged portion 55 has an inner-diameter dimension that is larger than the outer-diameter dimension of the input-side engaging portion 8 in order that the input-side engaging portion 8 may be loosely inserted inside therein. Furthermore, in a state before a pair of elastic bodies 56 (described later) is installed, and in a state in which the pair of pressing surfaces 32 of the engaging element 5 comes in contact with the pressed surface 20 and the input-side engaging portion 8 is located in a central portion in the width direction of the main engaging element body 30, as illustrated in FIG. 10, the distance Wa between the edges of the ends of the pivot-support shaft 33 and the input-side engaging portion 8 that are on the far sides from each other is set to be equal to or less than the distance Wb between the edges of the ends of the support hole 53 and the input-side engaged portion 55 that are on far sides from each other (Wa<Wb).

The difference Wb−Wa between the distance Wa and the distance Wb, from the aspect of simplifying assembly of the reverse-input blocking clutch 1, is preferably as large as possible. However, the difference Wb−Wa, from the aspect of being able to achieve an unlocked state by causing the engaging element 5 to immediately move inward in the radial direction when rotational torque is inputted to the input member 2, is preferably as small as possible. Moreover, in a case where there is a difference Wb−Wa between the distance Wa and the distance Wb, a gap exists all the way around between the outer peripheral surface of the input-side engaging portion 8 and the inner peripheral surface of the input-side engaged portion 55, and thus unless some measure is taken, looseness will occur in the input member 2.

In a case of using the reverse-input blocking clutch 1 of this example by installing the reverse-input blocking clutch 1 in a position adjusting device of a machining table or the like, an input-side mechanism such as an electric motor as a rotation drive source is connected to the input member 2. In such a case, control of the operation of the device in which the reverse-input blocking clutch 1 is installed is performed by controlling (rotation control, torque control, or the like) the input-side mechanism; however, when there is looseness in the input member 2, it becomes difficult to perform control or the like when switching the reverse-input blocking clutch 1 from a locked state or semi-locked state to an unlocked state, and there is a possibility that the controllability of the input-side mechanism will decrease. Therefore, in this example, in order to maintain workability when assembling the reverse-input blocking clutch 1, and suppress looseness in the input member 2, elastic bodies 56 are used.

(Elastic Body)

Figure 8:
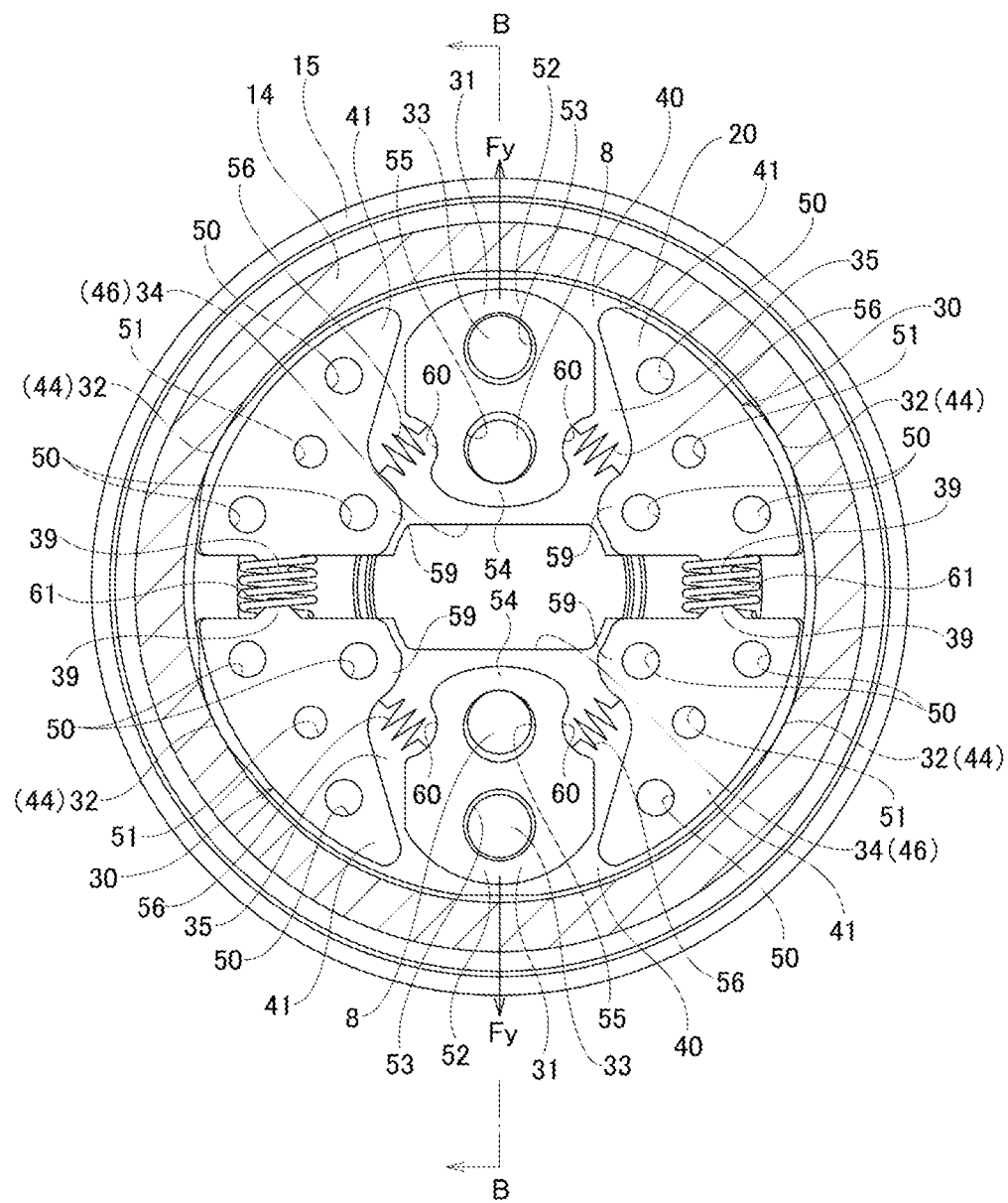
FIG. 8 is a view of the reverse-input blocking clutch illustrated in FIG. 3 and illustrates a state in which the output member, a left-side end portion of the output-side housing element, an output-side bearing, a main body plate on the left side, bolts, and nuts are removed, and illustrates a state as viewed from the left side in FIG. 3.
Figure 9:
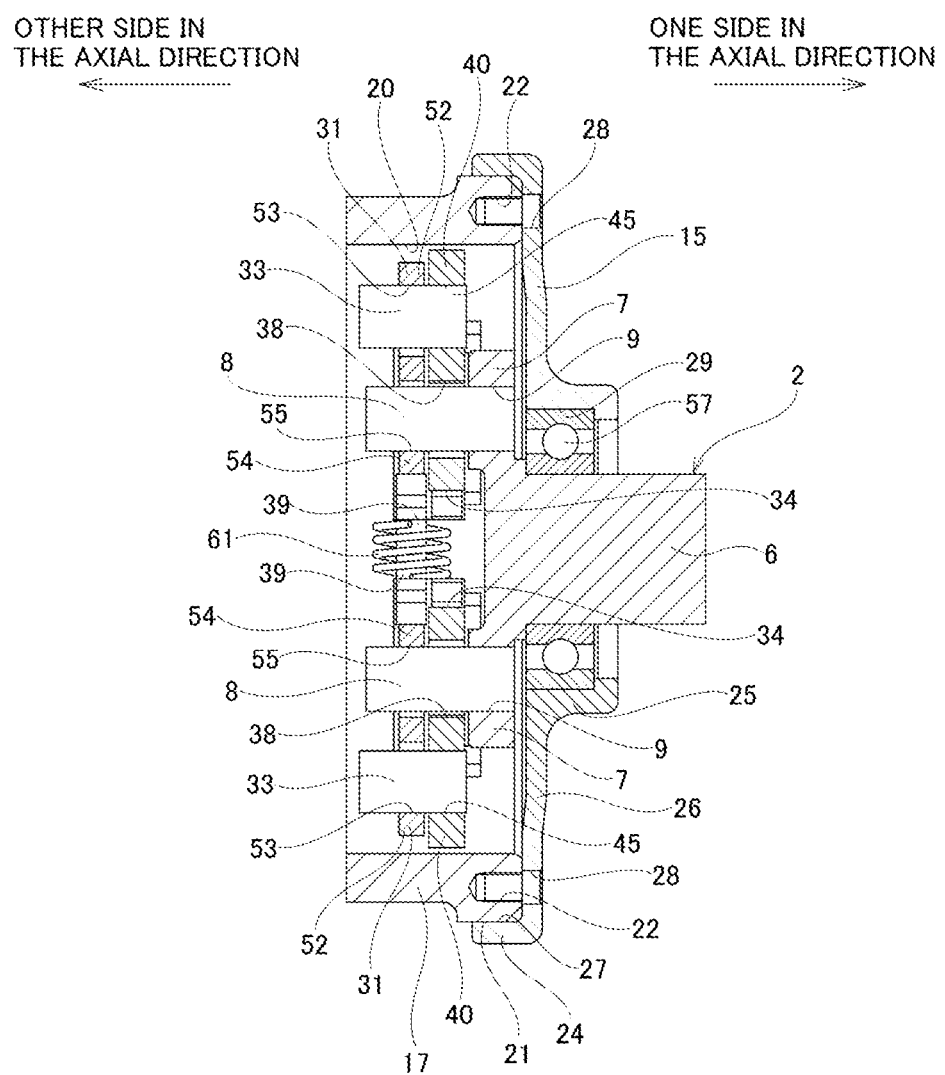
FIG. 9 is a cross-sectional view of section B-B in FIG. 8.

In the reverse-input blocking clutch 1 of this example, for each engaging element 5 of the pair of engaging elements 5, the elastic bodies 56 are configured by a pair of elastic bodies 56. Therefore, in this example, a total of four elastic bodies are provided. The pair of elastic bodies 56, as illustrated in FIG. 8, is arranged between the main engaging element body 30 and the link member 31, and the elastic bodies 56 apply an elastic force Fy to the link member 31 outward in the radial direction of the main engaging element body 30, which is the direction in the first direction toward the pressed surface 20.

In this example, each elastic body 56 is configured by a coil spring and is composed of identical parts having the same spring characteristics. The outer-diameter dimension of the elastic body 56 (diameter dimension of the coil portion) is smaller than the width direction in the axial direction of the internal space 35 (thickness direction of the intermediate plates 41). The pair of elastic bodies 56 is arranged on the inner side of the internal space 35, and on both sides of the link member 31 in the width direction of the main engaging element body 30 (engaging element 5) that corresponds to the second direction. Each elastic body 56 is elastically held between a constricted portion 60 provided in the link member 31 and an overhang portion 59 provided in the intermediate plate 41. In this state, a portion of the elastic body 56 enters inside the constricted portion 60. In this example, the elastic body 56 is not fastened to either the intermediate plate 41 or the link member 31, but is elastically held between the intermediate plate 41 and the link member 31. However, in a case of implementing the present invention, the elastic body may be fastened to either one or both of the intermediate plate and the link member. In a case of fastening the elastic body, it is possible to use various conventionally known fastening means such as screws, crimping, welding, or the like.

Figure 11:
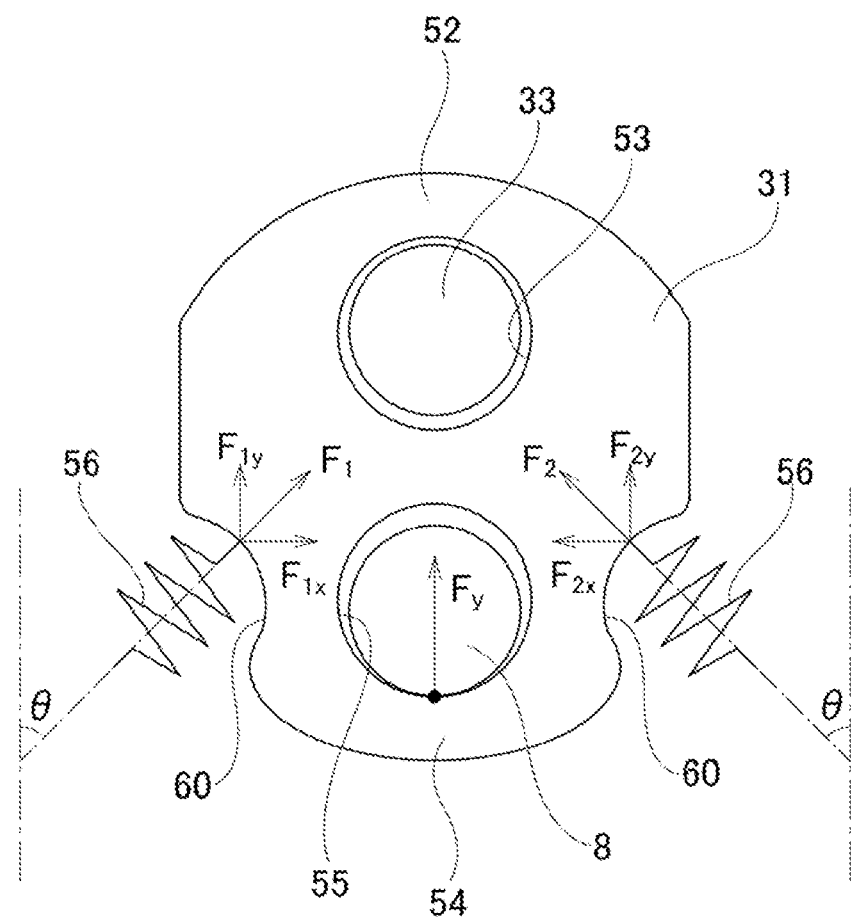
FIG. 11 is a view corresponding to FIG. 10 and illustrates an installed state of a pair of elastic bodies.
Figure 12:
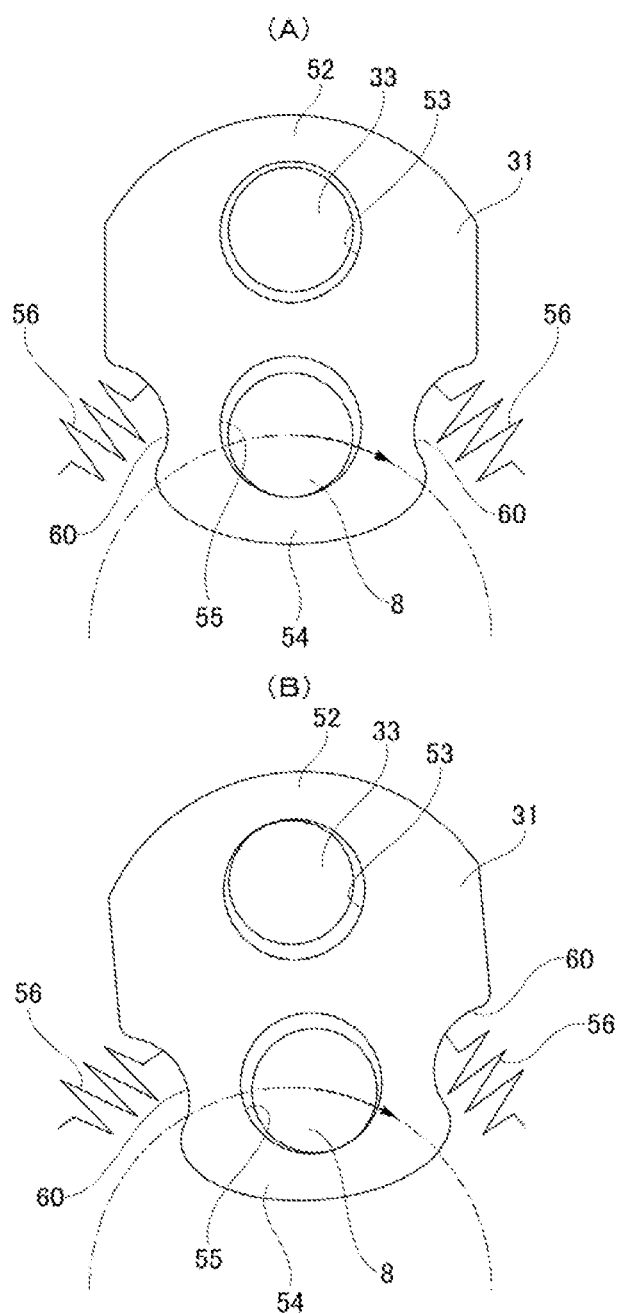
FIG. 12A and FIG. 12B are views illustrating states before and after rotational torque is inputted to the input member, and illustrates the relationship between an input-side engaging portion, a link member, and a pivot-support shaft, where

The center axis of each elastic body 56 of the pair of elastic bodies 56 is arranged on a virtual plane orthogonal to the center axis of the input member 2, and as illustrated in FIG. 11, each is inclined by just the same angle θ with respect to the radial direction of the main engaging element body 30, which is the first direction. Therefore, the elastic forces $F_1$, $F_2$ that are respectively applied to the link member 31 from each of the pair of elastic bodies 56 have a first component $F_{1y}$, $F_{2y}$ in a direction outward in the radial direction, which is the direction in the first direction going toward the pressed surface 20, and have a second component $F_{1x}$, $F_{2x}$ in a direction toward the central side in the width direction, which is the direction in the second direction going toward the input-side engaging portion 8.

The first component $F_{1y}$ of the elastic force $F_1$ applied to the link member 31 from one elastic body 56 and the first component $F_{2y}$ of the elastic force $F_2$ applied to the link member 31 from the other elastic body 56 each have identical magnitudes, and the directions in which the forces act are identical. Therefore, a force $F_y$ ($F_{1y}+F_{2y}$) that is the sum of the first component $F_{1y}$ and the first component $F_{2y}$ acts on the link member 31 in a direction toward the outer side in the radial direction of the main engaging element body 30.

On the other hand, the second component Fix of the elastic force $F_1$ that is applied to the link member 31 from the one elastic body 56 and the second component $F_{2x}$ of the elastic force $F_2$ that is applied to the link member 31 from the other elastic body 56 each have identical magnitudes, and the directions in which the forces act are opposite from each other. Therefore, the second component Fix of the elastic force $F_1$ and the second component force $F_{2x}$ of the elastic force $F_2$ cancel each other out when the link member 31 is in a neutral position of no pivoting.

In this example, as illustrated in FIG. 11, in the neutral state in which rotational torque is not inputted to the input member 2 and the output member 3, the elastic force (Fy) applied to the link member 31 from the pair of elastic bodies 56 elastically presses the end portion of the inner peripheral surface of the input-side engaged portion 55 on the inner side in the radial direction, which is the far side from the pressed surface 20 in the first direction, against the end portion of the outer surface of the input-side engaging portion 8 on the inner side in the radial direction, which is far side from the pressed surface 20 in the first direction. In other words, there is no circular gap between the input-side engaged portion 55 and the input-side engaging portion 8, but rather a substantially crescent shaped gap is defined by the outer side in the radial direction of the input-side engaging portion 8. On the other hand, a gap is defined around the entire circumference between the support hole 53 and the pivot-support shaft 33.

(Biasing Member)

Figure 13:
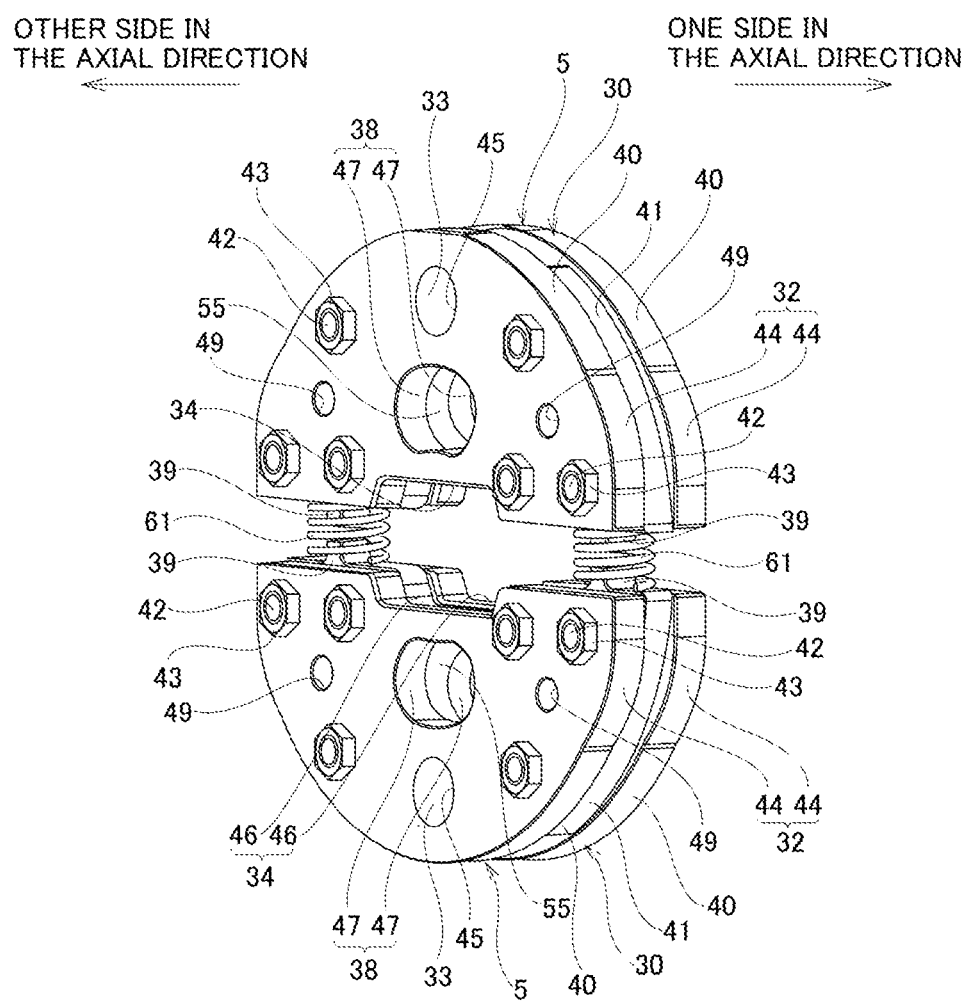
FIG. 13 is a perspective view of a pair of engaging elements and biasing members of the reverse-input blocking clutch of the first example.
Figure 14:
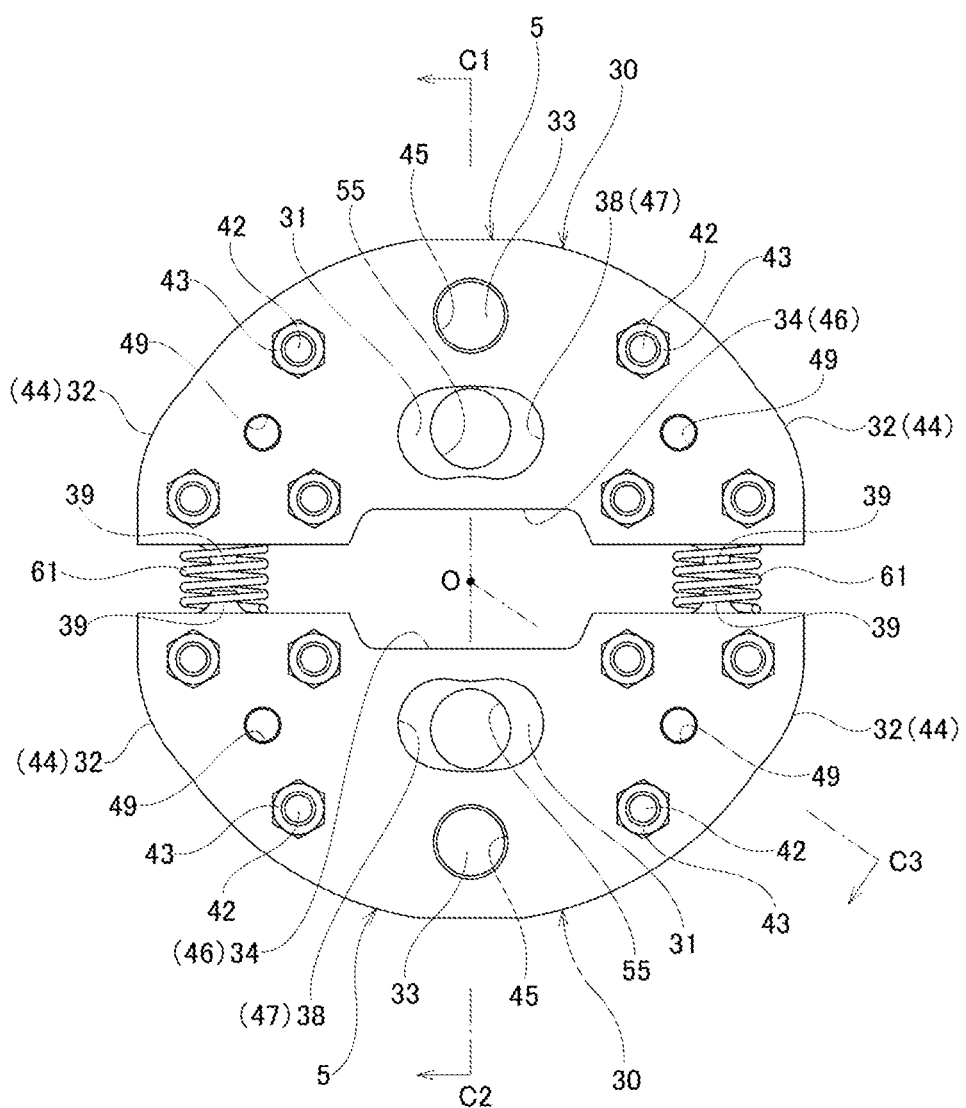
FIG. 14 is a view of the pair of engaging elements and biasing members of the reverse-input blocking clutch of the first example as viewed in the axial direction from the output member side.

In the reverse-input blocking clutch 1 of this example, the biasing member 61 is configured by a pair of biasing members 61. As illustrated in FIG. 13 and FIG. 14, the pair of biasing members 61 is arranged between portions on both sides in the width direction of the inner-side surfaces in the radial direction of the pair of main engaging element bodies 30 of the pair of engaging elements 5. In other words, the pair of biasing members 61 are arranged in positions separated from the output-side engaging portion 11 in the width direction of the main engaging element bodies 30 that correspond to the second direction. The pair of biasing members 61 elastically presses the pair of engaging elements 5 in directions outward in the radial direction, or in other words, presses the pair of engaging elements 5 in directions toward the pressed surface 20. As a result, in a neutral state in which torque is not applied to either the input member 2 or output member 3, the pressing surfaces 32 of each of the pair of engaging elements 5 are put into a state of contact with the pressed surface 20.

In this example, the biasing members 61 are configured by coil springs, and by inserting the holding convex portions 39 of the pair of engaging elements 5 inside the portions on both sides in the axial direction of the biasing members 61, the biasing members 61 are prevented from falling out from between the inner-side surfaces in the radial direction of the pair of main engaging element bodies 30.

Figure 15:
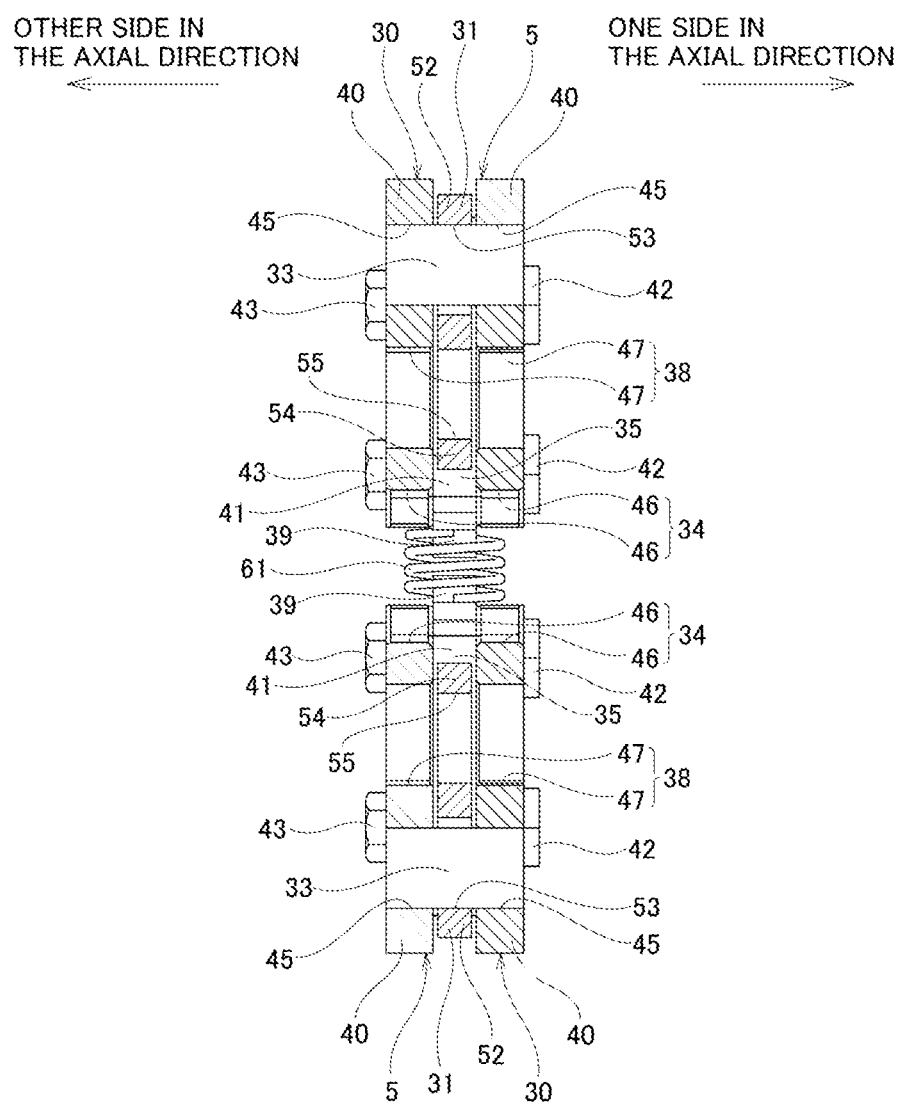
FIG. 15 is a cross-sectional view of section C1-C2 in FIG. 13.
Figure 16:
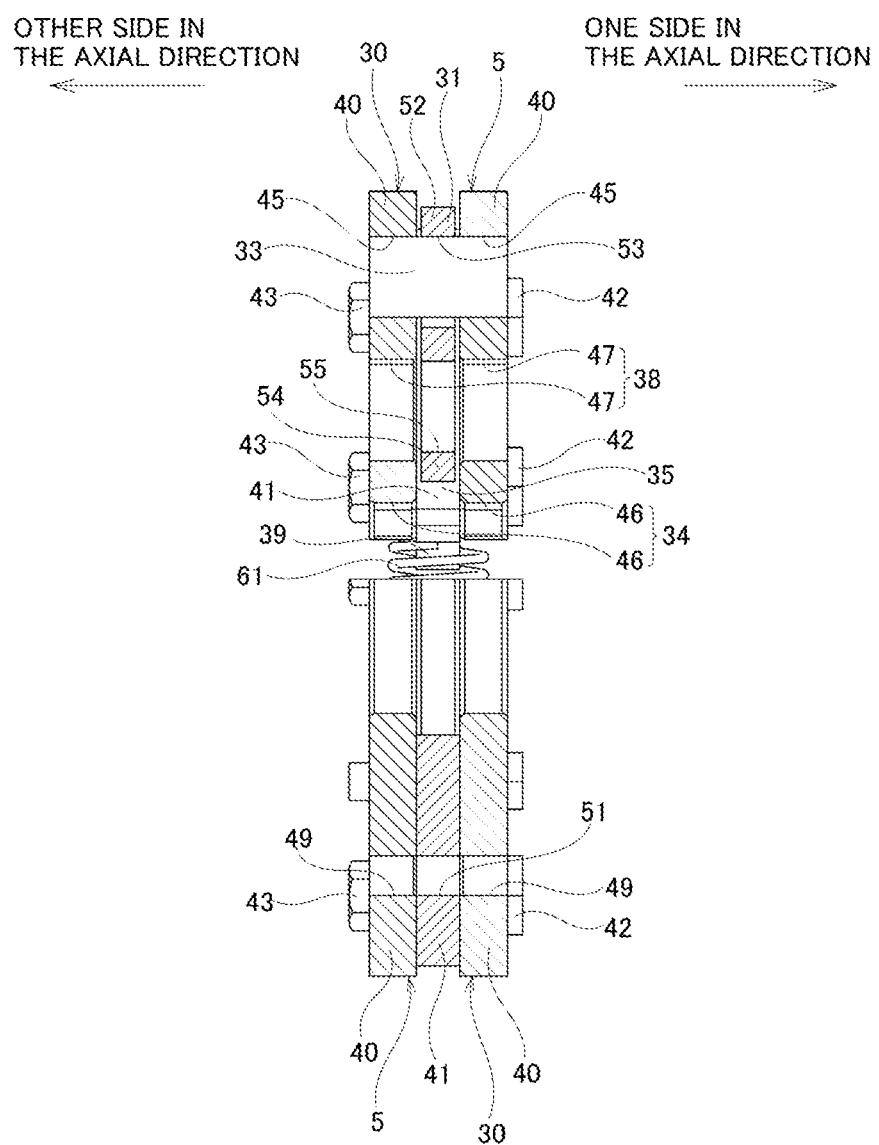
FIG. 16 is a cross-sectional view of section C1-O-C3 in FIG. 13.

In this example, the outer-diameter dimension of each biasing member 61 is smaller than the thickness dimension in the axial direction of the main engaging element body 30. Therefore, the biasing members 61, as illustrated in FIG. 15 and FIG. 16, do not protrude further toward both sides (toward the outside) in the axial direction than the side surfaces of both sides in the axial direction of the main engaging element bodies 30.

In the neutral state as described above, the reason that the pressing surfaces 32 of each of the pair of engaging elements 5 is in a state of contact with the pressed surface 20 is so that a locked state can be immediately achieved when a rotational torque is reversely inputted to the output member 3 as will be described later.

In the assembled state of the reverse-input blocking clutch 1 of this example, the pair of input-side engaging portions 8 of the input member 2 that is arranged on the one side in the axial direction is inserted in the axial direction through the insertion hole 38 of each engaging element 5 of the pair of engaging elements 5 (through holes 47 of the main body plates 40) and the input-side engaged portions 55 of the link members 31, and the output-side engaging portion 11 of the output member 3 arranged on the other side in the axial direction is inserted in the axial direction between the output-side engaged portions 34 of the pair of engaging elements 5. In other words, the pair of engaging elements 5 is arranged so that the output-side engaged portions 34 sandwich the output-side engaging portion 11 from the outer sides in the radial direction.

[Operation of Reverse-Input Blocking Clutch]

As illustrated in FIG. 6, when a rotational torque is inputted to the input member 2 from an input-side mechanism, the input-side engaging portions 8 rotate on the inner side of insertion holes 38 of the main engaging element bodies 30 in the direction of rotation of the input member 2 (clockwise direction in the example in FIG. 6). As a result, as illustrated in FIG. 5, FIG. 6 and FIGS. 12A to 12B, the input-side engaging portions 8, due to engagement with the input-side engaged portions 55, cause the link members 31 to pivot while moving inward in the radial direction. Accordingly, of the pair of elastic bodies 56, the elastic body 56 existing on the front side of the link member 31 in the direction of rotation of the input member 2 (right side in FIGS. 12A, 12B) is compressed between the link member 31 and the intermediate plate 41, causing the gap between the support hole 53 and the pivot-support shaft 33 to decrease. When the outer-side portion in the radial direction of the inner peripheral surface of the support hole 53 comes in contact with the outer-side portion in the radial direction of the outer peripheral surface of the pivot-support shaft 33, the input-side engaging portion 8, through the link member 31, pulls the pivot-support shaft 33 inward in the radial direction. As a result, as illustrated in FIG. 6, each of the pair of engaging elements 5 moves in a direction away from the pressed surface 20 (inward in the radial direction). The pressing surfaces 32 of each engaging element 5 of the pair of engaging elements 5 move away from the pressed surface 20, the pair of output-side engaged portions 34 holds the output-side engaging portion 11 of the output member 3 from both sides in the radial direction, and the output-side engaging portion 11 and the pair of output-side engaged portions 34 engage without looseness. As a result, rotational torque that is inputted to the input member 2 is transmitted to the output member 3 through the pair of engaging elements 5 and outputted from the output member 3.

Particularly, in the construction of this example, when the engaging elements 5 move in directions away from the pressed surface 20 (inward in the radial direction) as described above, as illustrated in FIG. 5, FIG. 6, FIG. 20A and FIG. 20B, the pair of guide surfaces 13 provided on the output-side engaging portion 11 guides the pair of guided surfaces 37 provided on the output-side engaged portions 34, which restricts movement of the engaging elements 5 in the width direction. Then as illustrated in FIG. 6 and FIG. 20B, the bottom surfaces 36 of the output-side engaged portions 34 come in surface contact with the side surfaces 12 of the output-side engaging portion 11, and the pair of guided surfaces 37 of the output-side engaged portions 34 come in surface contact with the pair of guide surfaces 13 of the output-side engaging portion 11. Therefore, in the construction of this example, after releasing the locked state or unlocked state, it is possible to effectively prevent the engaging elements 5 from shifting in the width direction and coming into contact with the pressed surface 20. In the construction of this example, guiding the movement of the engaging elements 5 inward in the radial direction as described above can be performed by using the output-side engaging portion 11, and thus when compared with construction in which special parts are installed to be used just for performing such guidance, it is possible to reduce the number of parts.

Moreover, in the construction of this example, each guided surface 37 of the pair of guided surfaces 37 of the output-side engaged portions 34 is configured by a pair of concave curved surfaces that are inclined in directions increasing the distance between each other while going inward in the radial direction, and each guide surface 13 of the pair of guide surfaces 13 of the output-side engaging portion 11 is configured by a pair of convex curved surfaces that coincide with the pair of concave curved surfaces. Therefore, as illustrated in FIG. 20A, in a state in which the engaging elements 5 move outward in the radial direction away from the output-side engaging portion 11, gaps are formed between the pair of guided surfaces 37 and the pair of guide surfaces 13, and the size of the gaps (dimension in the width direction) increases going outward in the radial direction. Therefore, in the construction of this example, in a state in which the engaging elements 5 move outward in the radial direction away from the output-side engaging portion 11, it is possible to appropriately allow movement of the engaging elements 5 in the width direction and the direction of rotation, and it is possible to effectively prevent unreasonable force from being applied to the engaging elements 5.

Figure 7:
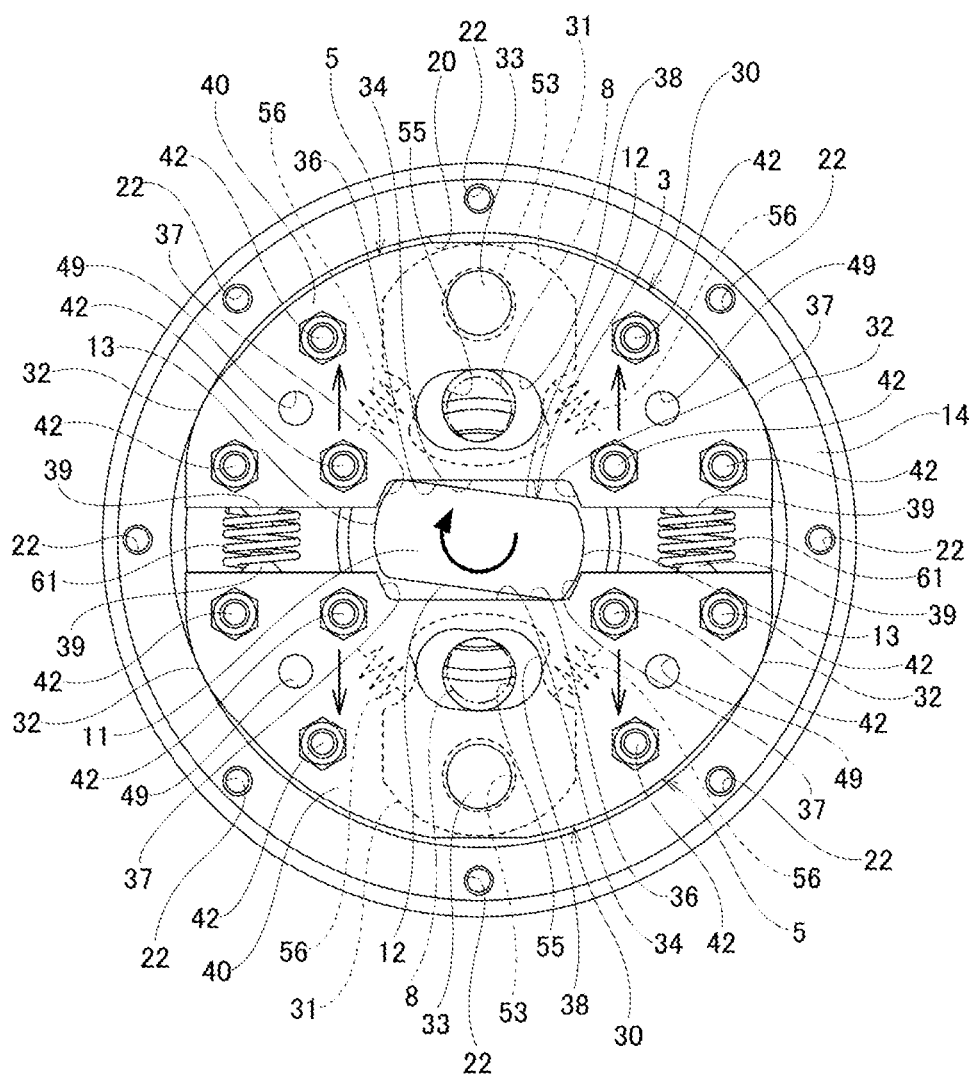
FIG. 7 is a view similar to FIG. 5 and illustrates a state in which a rotational torque is reversely inputted to the output member.

On the other hand, as illustrated in FIG. 7, when rotational torque is reversely inputted to the output member 3 from an output-side mechanism, the output-side engaging portion 11 rotates on the inner side of the pair of output-side engaged portions 34 in the direction of rotation (clockwise direction in the example in FIG. 7) of the output member 3. When this occurs, the corner portions that are the connecting portions between the side surfaces 12 and the guide surfaces 13 of the output-side engaging portion 11 press the bottom surfaces 36 of the output-side engaged portions 34 outward in the radial direction, which causes each of the pair of engaging elements 5 to move in directions toward the pressed surface 20 (outward in the radial direction). Accordingly, the pressing surfaces 32 of each engaging element 5 of the pair of engaging elements 5 are pressed against the pressed surface 20, and each of the pressing surfaces 32 frictionally engages with the pressed surface 20. As a result, rotational torque that is reversely inputted to the output member 3 is transmitted to the housing 4 that is fixed to another member and does not rotate, and thus is completely blocked and is not transmitted to the input member 2, or only a part of the rotational torque that is reversely inputted to the output member 3 is transmitted to the input member 2 and the remaining part is blocked.

In order that rotational torque that is reversely inputted to the output member 3 is completely blocked so as not to be transmitted to the input member 2, the output member 3 is locked by wedging the pair of engaging elements 5 between the output-side engaging portion 11 and the pressed surface 20 so that the pressing surfaces 32 do not slide (rotate relative to) with respect to the pressed surface 20. On the other hand, in order that only a part of rotational torque that is reversely inputted to the output member 3 is transmitted to the input member 2 and the remaining portion is blocked, the output member 3 is semi-locked by wedging the pair of engaging elements 5 between the output-side engaging portion 11 and the pressed surface 20 so that the pressing surfaces 32 slide with respect to the pressed surface 20. In a state in which the output member 3 is semi-locked and rotational torque is further reversely inputted to the output member 3, the pair of engaging elements 5, due to the engagement between the output-side engaging portion 11 and the output-side engaged portions 34, rotate around the center of rotation of the output member 3 while allowing the pressing surfaces 32 to slide with respect to the pressed surface 20. As the pair of engaging elements 5 rotate, the input-side engaging portions 8 are pulled by the pivot-support shafts 33 through the link members 31, and part of the rotational torque is transmitted to the input member 2.

In this example, each engaging element 5 of the pair of engaging elements 5 has pressing surfaces 32 at two locations on the outer-side surface in the radial direction of the main engaging element body 30 that are separated in the circumferential direction, and thus when rotational torque is reversely inputted to the output member 3, it is possible to increase the frictional engagement force between the pressed surface 20 and the pressing surfaces 32 due to a wedge effect. However, in a case of implementing the present invention, it is also possible to employ construction in which there is a pressing surface at only one location on the outer-side surface in the radial direction of the main engaging element body in the circumferential direction.

With the reverse-input blocking clutch 1 of this example, it is possible to prevent a decrease in controllability of the input-side mechanism for driving the input member 2.

In other words, in this example, as illustrated in FIG. 8 and FIG. 11, in the neutral state in which rotational torque is not inputted to the input member 2 and output member 3, the elastic force of the pairs of elastic bodies 56 are able to elastically press the end portions of the inner peripheral surfaces of the input-side engaged portions 55 provided in the link members 31 that are on the inner side in the radial direction that are the far sides from the pressed surface 20 in the first direction against the end portions of the outer peripheral surfaces of the input-side engaging portions 8 on the inner sides in the radial direction that are the far sides from the pressed surface 20 in the first direction. Therefore, in the neutral state, in order to rotate the input member 2, it is necessary to compress the elastic bodies 56 of the pairs of elastic bodies 56 that exist on the front sides of the link members 31 in the direction of rotation of the input member 2 through the link members 31. Accordingly, taking into consideration the workability during assembly of the reverse-input blocking clutch 1 as in this example, even in a case of setting the distance Wa between the edges of the ends on the far sides from each other of the pivot-support shaft 33 and the input-side engaging portion 8 so as to be equal to or less than the distance Wb between the edges of the ends on the far sides from each other of the support hole 53 and the input-side engaged portion 55 as illustrated in FIG. 10, it is possible to prevent the input-side engaging portion 8 from rotating with a light force, and it is possible to suppress looseness of the input member 2.

Accordingly, an input-side mechanism such as an electric motor or the like as a rotation drive source is connected to the input member 2, and even in a case of installing and using the reverse-input blocking clutch 1 of this example in a position adjusting device of a machining table or the like, it is possible to prevent control for switching the reverse-input blocking clutch 1 from a locked state or a semi-locked state to an unlocked state from becoming complicated, and it is possible to prevent a decrease in the controllability of the input-side mechanism.

With the reverse-input blocking clutch 1 of this example, when rotational torque is inputted to the input member 2, it is possible to smoothly switch from a locked state or a semi-locked state to an unlocked state. This will be explained with reference to FIG. 19A and FIG. 19B.

FIG. 19A (a) and FIG. 19A (b) illustrate the positional relationship between part of the input member 2 and part of an engaging element 5. More specifically, FIG. 19A (a) illustrates the positional relationship in a locked state or semi-locked state illustrated in FIG. 7. FIG. 19A (b) illustrates the positional relationship in a state in which by inputting rotational torque T to the input member 2 in the state illustrated in FIG. 19A (a), the input-side engaging portion 8 rotates in the direction of rotation of the input member 2 (clockwise direction in the illustrated example), the elastic body 56 existing on the front side of the link member 31 in the direction of rotation of the input member 2 (right side in FIG. 19A (a) and FIG. 19A (b)) of the pair of elastic bodies 56 is compressed, the gap between the support hole 53 and the pivot-support shaft 33 is decreased, and a translational load F begins to be applied from the input-side engaging portion 8 to the pivot-support shaft 33 through the link member 31.

On the other hand, FIG. 19B (a) and FIG. 19B (b) illustrate a mutual positional relationship between a part of the input member 102z and a part of the engaging element 105 in construction of a comparative example, or in other words, construction having the same configuration as the conventional construction described above except that the input-side engaging portion 107z of the input member 102z has a circular columnar shape. More specifically, FIG. 19B (a) illustrates the positional relationship in a locked state or semi-locked state when the input-side engaging portion 107z is located in the central portion in the width direction of the engaging element 105. FIG. 19B (b) illustrates the positional relationship in a state in which, by inputting a rotational torque T to the input member 102z in the state illustrated in FIG. 19B (a), the input-side engaging portion 107z rotates in the direction of rotation of the input member 102z (clockwise direction in the illustrated example), the input-side engaging portion 107z comes in contact with the input-side engaged portion 113 of the engaging element 105, and a translational load Ft due to the rotational torque begins to be applied at the point of contact X between the input-side engaging portion 107z and the input-side engaged portion 113.

As illustrated in FIG. 19B (b), in the construction of the comparative example, the direction of the translational load Ft, or in other words, the direction of the load acting on the engaging element 105 from the input member 102z is largely inclined with respect to the radial direction of the engaging element 105 that is the direction in which the engaging element 105 moves when switching from a locked state or semi-locked state to an unlocked state (direction of movement of the engaging element 105 when moving toward or away from the pressed surface).

On the other hand, as illustrated in FIG. 19A (b), in the construction of this example, the direction of the translational load F, or in other words, the direction of the load acting on the engaging element 5 from the input member 2, is mostly parallel to the radial direction of the engaging element 5 that is the direction in which the engaging element 5 moves when switching from a locked state or semi-locked state to an unlocked state (direction of movement of the engaging element 5 when moving toward or away from the pressed surface 20). In other words, the angle between the direction of the translational load F and the direction in which the engaging element 5 moves is smaller than the angle between the direction of the translational load Ft and the direction in which the engaging element 105 moves in the comparative example. That is, in the construction of this example, the rotational torque T that is inputted to the input member 2 can be efficiently converted to a load for moving the engaging element 5 inward in the radial direction. Therefore, with the construction of this example, when rotational torque is inputted to the input member 2, it is possible to smoothly switch from a locked state or semi-locked state to an unlocked state.

In the construction of the example illustrated in FIG. 10, from the aspect of simplifying assembly of the reverse-input blocking clutch, the difference Wb−Wa of the distance Wa between the edges of the ends on the far sides from each other of the pivot-support shaft 33 and the input-side engaging portion 8 and the distance Wb of the edges of the ends on the far sides from each other of the support hole 53 and the input-side engaged portion 55 is preferably as large as possible; however, on the other hand, from the aspect of being able to achieve an unlocked state by immediately moving the engaging element 5 inward in the radial direction when rotational torque is inputted to the input member 2, is preferably as small as possible. Accordingly, taking the circumstances above into consideration, it is necessary in the production of the reverse-input blocking clutch to adjust the size of the difference Wb−Wa to an appropriate size.

Note that in regard to this, in the construction of the comparative example, this is also true for the size of the gap Gz existing between the inner-side surface in the radial direction of the input-side engaging portion 107z and the input-side engaged portion 113. However, in the construction of the comparative example, in order to adjust the size of the gap Gz, in some cases it may be necessary to finish the portion of the input-side engaged portion 113 that is in contact with the inner-side surface in the radial direction of the input-side engaging portion 107z with high precision such as by using a machining process; and in such a case, it is expected that the cost would increase. However, in the construction of this example, it is possible to adjust the size of the difference Wb−Wa by simply managing the distance between centers of the support hole 53 and input-side engaged portion 55 of the link member 31; and since the link member 31 is made using inexpensive press working, it is easy to keep costs down.

In this example, neither of the pair of elastic bodies 56 is fastened to the main engaging element body 30 or the link member 31, and each is elastically held by the main engaging element body 30 and the link member 31. Therefore, it is possible to omit the work for fastening the elastic bodies 56, and to reduce the number of parts used for fastening. Accordingly, it is possible to reduce the cost of producing the reverse-input blocking clutch 1. Moreover, in order to keep the installation space of the elastic bodies 56 small, it is possible to make the reverse-input blocking clutch 1 more compact.

The elastic bodies 56 are arranged between the pair of main body plates 40, and thus it is also possible to prevent the elastic bodies 56 from falling out in the axial direction from the main engaging element body 30. Furthermore, it is possible for part of the elastic bodies 56 to enter inside the constricted portion 60 provided in the link member 31, and thus it is possible to prevent the reverse-input blocking clutch 1 from becoming large due to providing the elastic bodies 56.

Second Example

Figure 21:
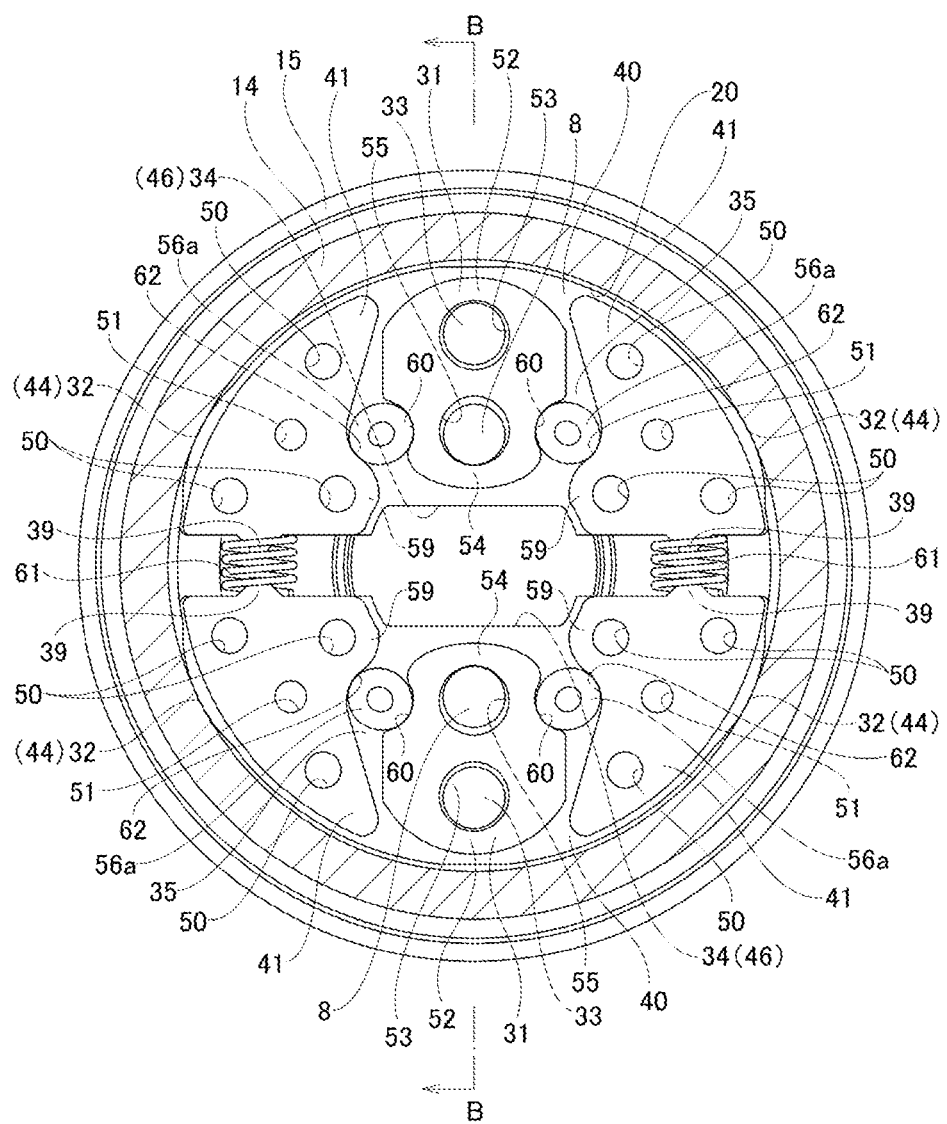
FIG. 21 is a view corresponding to FIG. 8, and illustrates a second example of an embodiment of the present invention.

A second example of an embodiment of the present invention will be described using FIG. 21.

This example is a modified example of the first example. In this example, each elastic body 56a of the pair of elastic bodies 56a is configured by rubber such as silicone rubber or the like. Each elastic body 56a is formed into an annular shape, and in a state in which the center axes of the elastic bodies 56a are arranged parallel with the center axis of the input member 2, is elastically held between the constricted portion 60 provided in the link member 31 and a recessed portion 62 provided in an intermediate portion on the side surface on the central side in the width direction of the intermediate plate 41. In other words, each elastic body 56a comes in contact with both the constricted portion 60 and the recessed portion 62.

In a state in which the elastic body 56a is elastically held between the constricted portion 60 and the recessed portion 62, the elastic body 56a elastically deforms along the concave curved surfaces of both the constricted portion 60 and the recessed portion 62. As a result, the elastic body 56a comes in surface contact with both the constricted portion 60 and the recessed portion 62. Therefore, both the constricted portion 60 and the recessed portion 62 function as seating surfaces that stabilize the contact position (contact state) with the elastic body 56a. Accordingly, it is possible to stabilize the position of the elastic body 56a even without fastening the elastic body to either of the main engaging element body 30 (intermediate plate 41) and the link member 31.

In this example, the work of assembling the elastic bodies 56a between the main engaging element body 30 and the link member 31 can be easily performed. Particularly, in a case where the elastic bodies 56a are formed into an annular shape when in the free state, there are no restrictions on the installation phase of the elastic bodies 56a, and thus the assembly work can be performed even more easily. Note that in a case in which annular shaped rubber elastic bodies are fastened to the main engaging element body, it is possible, for example, to adopt a configuration in which pins are arranged so as to span in the axial direction between the pair of main body plates 40, and the pins are inserted through the elastic bodies. With this kind of configuration, even in a case of adopting a configuration in which the elastic bodies are fastened, it is possible to prevent the reverse-input blocking clutch from becoming large.

The other configuration and operational effects of the second example are the same as in the first example.

Third Example

Figure 22:
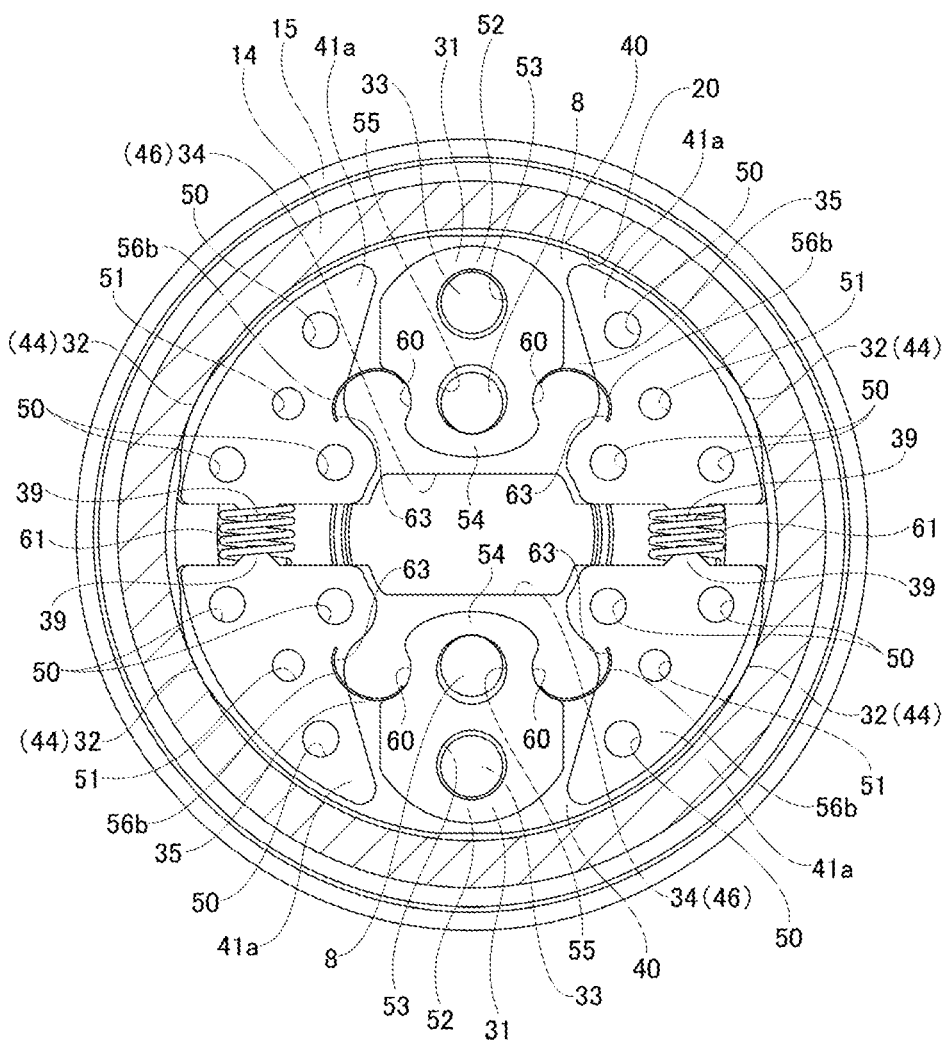
FIG. 22 is a view corresponding to FIG. 8, and illustrates a third example of an embodiment of the present invention.
Figure 23:
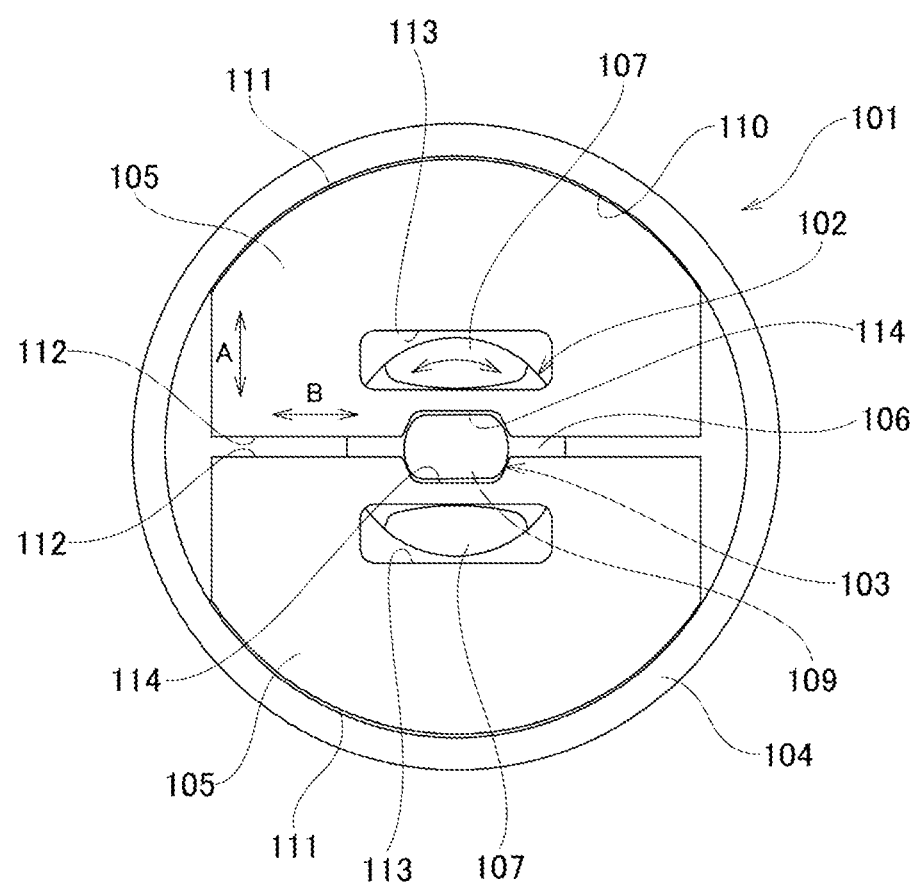
FIG. 23 is a view illustrating a conventional reverse-input blocking clutch.
Figure 24:
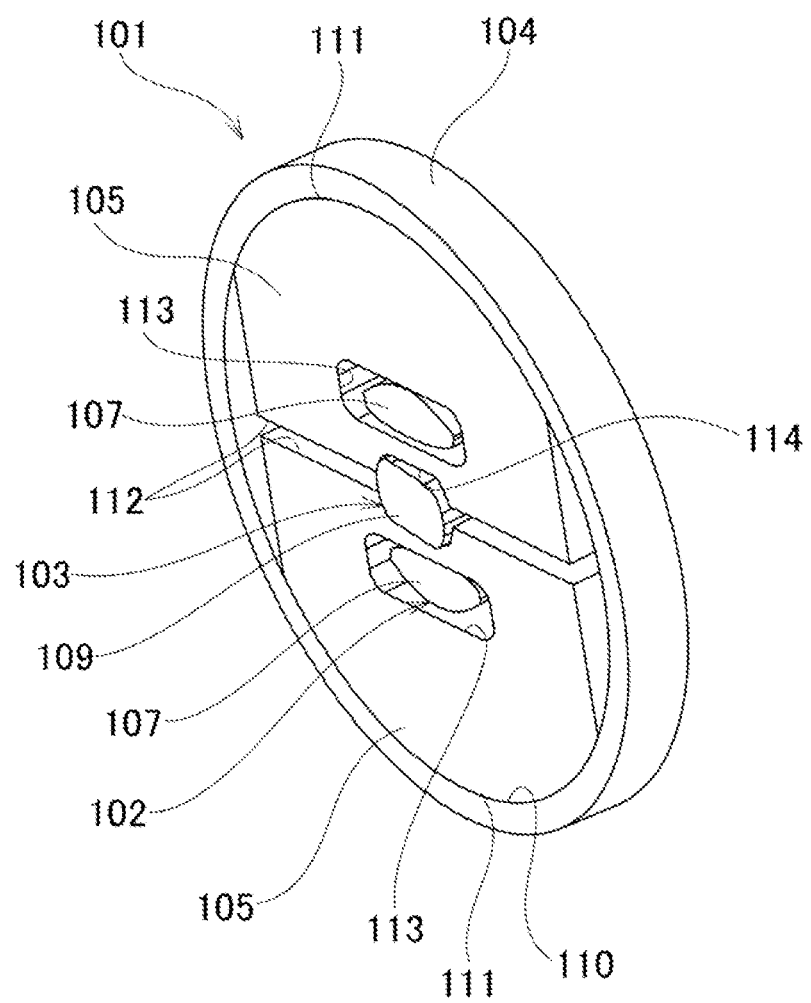
FIG. 24 is a perspective view of a conventional reverse-input blocking clutch.
Figure 25:
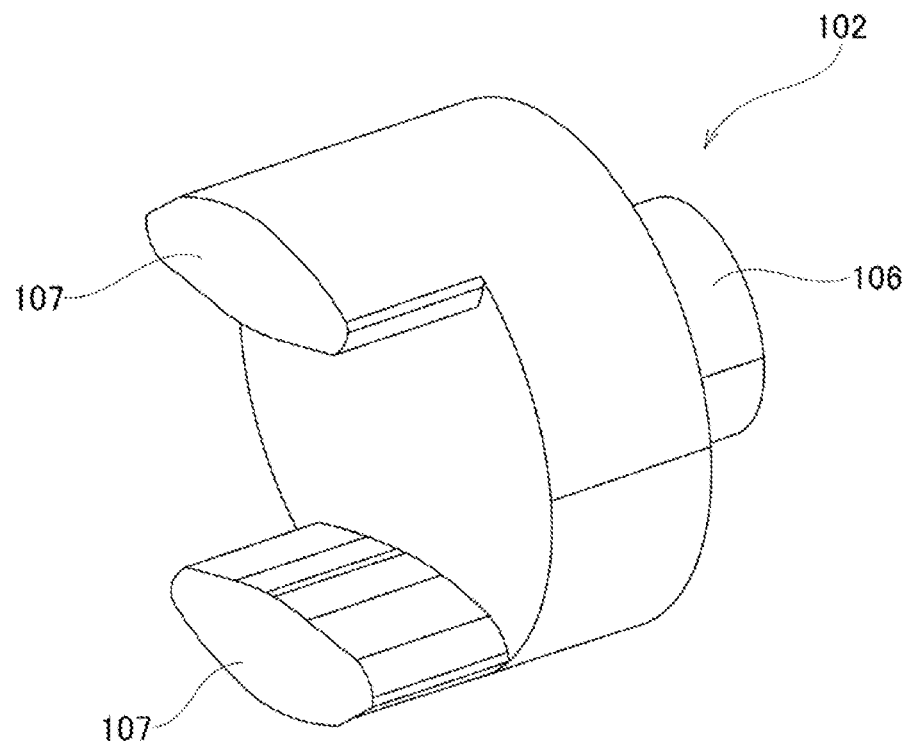
FIG. 25 is a perspective view illustrating part of an input member of a conventional reverse-input blocking clutch.
Figure 26:
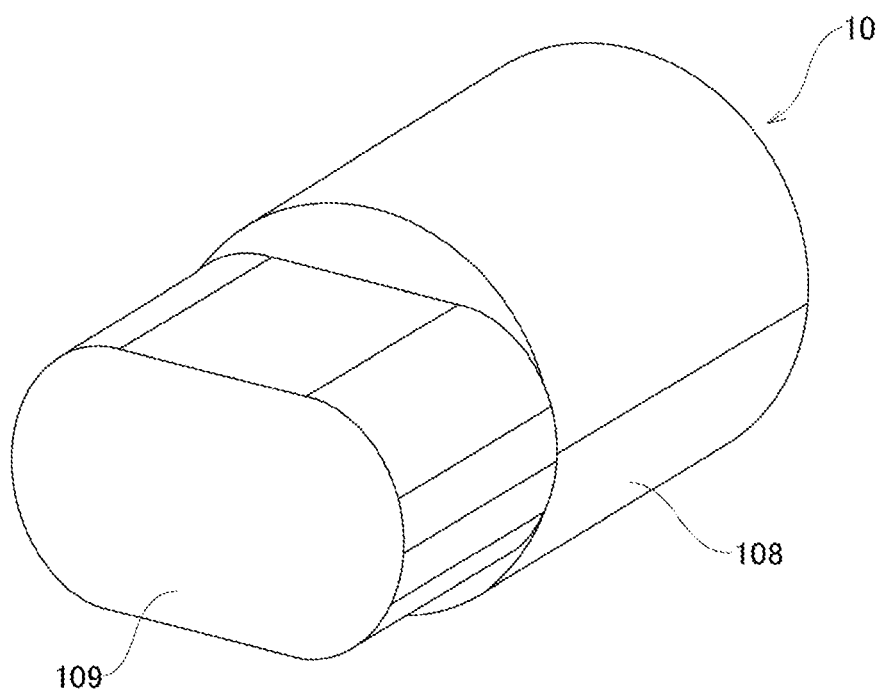
FIG. 26 is a perspective view illustrating part of an output member of a conventional reverse-input blocking clutch.
Figure 27:
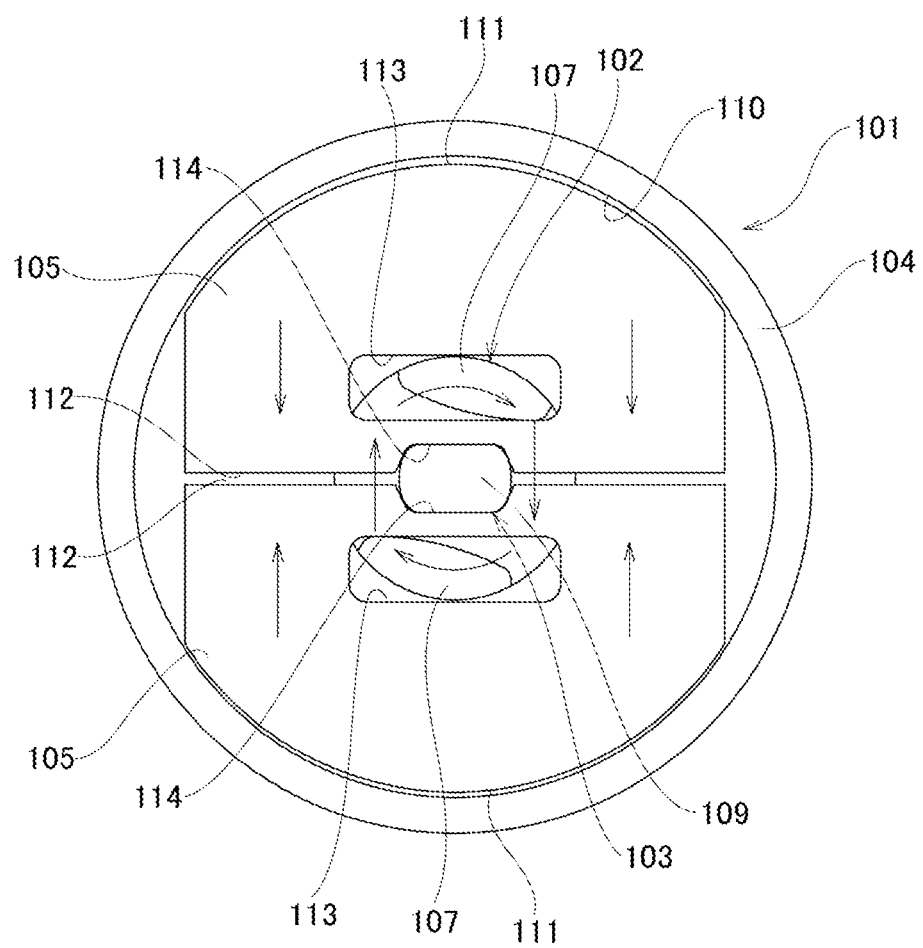
FIG. 27 is a view of a conventional reverse-input blocking clutch, and illustrates a state in which rotational torque is inputted to the input member.
Figure 28:
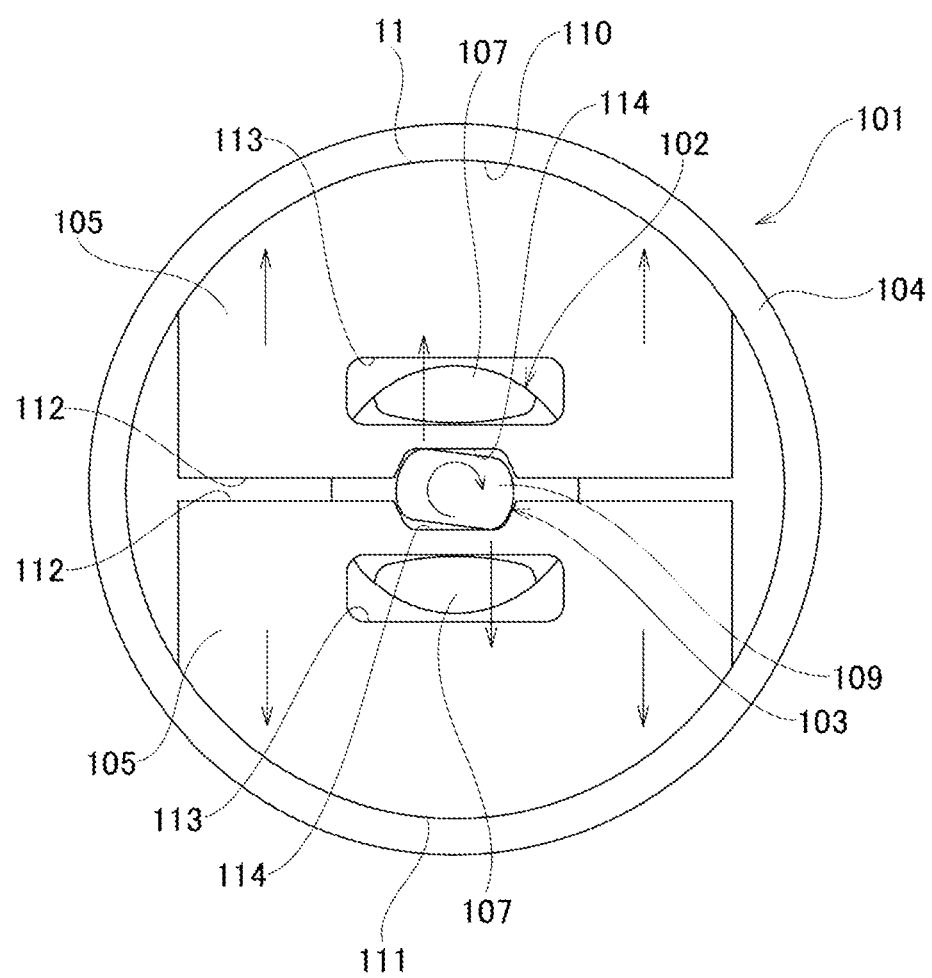
FIG. 28 is a view of a conventional reverse-input blocking clutch, and illustrates a state in which rotational torque is reversely inputted to the output member.
Figure 29:
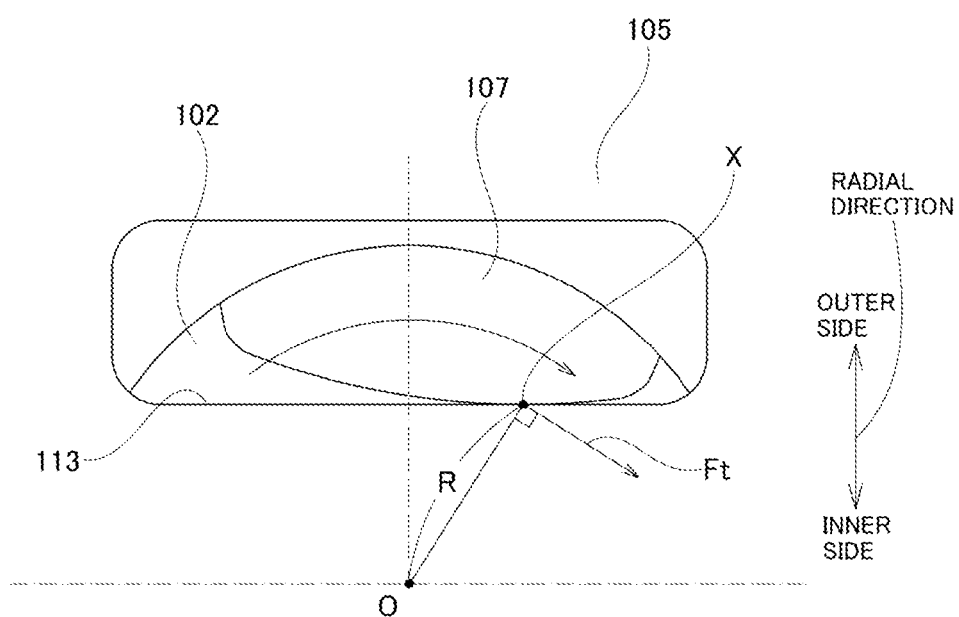
FIG. 29 is a partial enlarged view of FIG. 27.

A third example of an embodiment of the present invention will be described using FIG. 22.

This example is also a modified example of the first example. In this example, each elastic body 56b of the pair of elastic bodies 56b is configured of a leaf spring. Each elastic body 56b is formed in a substantially U shape, and arranged between the link member 31 and an intermediate plate 41a.

The end portion on one side of the elastic body 56b is curved along a constricted portion 60 and comes in surface contact with the constricted portion 60. Therefore, in a case of this example, the constricted portion 60 functions as a seating surface for stabilizing the contact position (contact state) of the elastic body 56b.

On the other hand, the end portion on the other side of the elastic body 56b is fastened to the intermediate plate 41a. In this example, by fastening the end portion on the other side of the elastic body 56b to a fastening groove 63 provided in a portion in the central side in the width direction of the intermediate plate 41a and curved in an arc shape, the end portion on the other side of the elastic body 56b is fastened to the intermediate plate 41a.

In this example, the elastic bodies 56b are configured of leaf springs, and thus it is possible to reduce the installation space of the elastic bodies 56b. Therefore, by providing the elastic bodies 56b, it is possible to prevent the reverse-input blocking clutch 1 from becoming large. Moreover, by fastening the end portion on the other side of the elastic body 56b to a fastening groove 63 provided in the intermediate plate 41a, the elastic body 56b is fastened to the intermediate plate 41a, and thus it is not necessary to use a special part such as screws or the like for fastening the elastic body 56b. Therefore, it is possible to prevent an increase in the weight of the reverse-input blocking clutch 1, and it possible to prevent the reverse-input blocking clutch 1 from becoming large.

The other configuration and operational effects of the third example are the same as those of the first example.

In a case of implementing the present invention, the construction of the examples of an embodiment can be appropriately combined and implemented within a range of no contradiction.

In a case of implementing the present invention, the construction and shape of the elastic body is not limited to the construction and shape described in each example of an embodiment of the present invention, and can be appropriately changed as long as it is possible to exert a function of applying elastic force to the link member in a direction outward in the radial direction. Moreover, the elastic body is not limited to construction of being arranged between the link member and the intermediate plates, and may also be arranged between the link member and the main body plate, or may be arranged between the link member and the pivot-support shaft. In this case, the elastic body may be fastened to the link member, and may also be fastened to the intermediate plate, the main body plate or the pivot-support shaft. Furthermore, in a case where the elastic body is assembled between the link member and the pivot-support shaft, it is possible, for example, to adopt a configuration of assembling the leaf spring shaped elastic body between the inner surface of a support hole provided in a first end portion of the link member and the outer surface of the pivot-support shaft, or the like.

In a case of implementing the present invention, as long as an elastic force Fy directed outward in the radial direction of the main engaging element body, which is the direction toward the pressed surface in the first direction, is applied to the link member, the number of elastic bodies assembled between the main engaging element body and the link member is not limited to two (a pair of elastic bodies) for each engaging element as described in each of the examples of an embodiment of the present invention, and it is possible to assemble only one for each engaging element, or it is also possible to assemble three or more for each engaging element. This kind of configuration can be made, for example, by changing the construction of the intermediate plate.

REFERENCE SIGNS LIST

1 Reverse-input blocking clutch
2 Input member
3 Output member
4 Housing
5 Engaging element
6 Input-shaft portion
7 Input-arm portion
8 Input-side engaging portion
9 Fitting hole
10 Output-shaft portion
11 Output-side engaging portion
12 Side surface
13 Guide surface
14 Output-side housing element
15 Input-side housing element
16 Bolt
17 Outer-diameter-side tubular portion
18 Inner-diameter-side tubular portion
19 Side plate portion
20 Pressed surface
21 Output-side in-row fitting surface
22 Screw hole
23 Output-side bearing fitting surface
24 Outer-diameter-side tubular portion
25 Inner-diameter-side tubular portion
26 Side plate portion
27 Input-side in-row fitting surface
28 Through hole
29 Input-side bearing fitting surface
30 Main engaging element body
31 Link member
32 Pressing surface
33 Pivot-support shaft
34 Output-side engaged portion
35 Internal space
36 Bottom surface
37 Guided surface
38 Insertion hole
39 Convex portion
40 Main body plate
41, 41a Intermediate plate
42 Bolt
43 Nut
44 Convex surface
45 Installation hole
46 Concave portion
47 Through hole
48 Through hole
49 Positioning hole
50 Through hole
51 Positioning hole
52 First end portion
53 Support hole
54 Second end portion
55 Input-side engaged portion
56, 56a, 56b Elastic body
57 Input-side bearing
58 Output-side bearing
59 Overhang portion
60 Constricted portion
61 Biasing member
62 Recessed portion
63 Fastening groove
101 Reverse-input blocking clutch
102, 102z Input member
103 Output member
104 Pressed member
105 Engaging element
106 Input-shaft portion
107, 107z Input-side engaging portion
108 Output-shaft portion
109 Output-side engaging portion
110 Pressed surface
111 Pressing surface
112 Bottom surface
113 Input-side engaged portion
114 Output-side engaged portion

The invention claimed is:

1. A reverse-input blocking clutch, comprising:
a pressed member having a pressed surface around an inner peripheral surface thereof;
an input member having an input-side engaging portion arranged on an inner side in a radial direction of the pressed surface, and coaxially arranged with the pressed surface;
an output member having an output-side engaging portion on the inner side in the radial direction of the pressed surface arranged further on the inner side in the radial direction than the input-side engaging portion, and coaxially arranged with the pressed surface;
an engaging element having a main engaging element body and a link member, and arranged on the inner side in the radial direction of the pressed surface so as to be able to move in a first direction as a direction away from or toward the pressed surface; and
an elastic body arranged between the main engaging element body and the link member, and applying an elastic force to the link member in a direction toward the pressed surface in the first direction;
the main engaging element body having a pressing surface facing the pressed surface, a pivot-supporting portion located on a side nearer to the pressed surface than the input-side engaging portion in the first direction, and an output-side engaged portion engaging with the output-side engaging portion;
the link member having a first end portion pivotally linked to the pivot-supporting portion, and a second end portion pivotally linked to the input-side engaging portion;
the second end portion having an input-side engaged portion into which the input-side engaging portion can be loosely inserted, and in a neutral state in which rotational torque is not inputted to either the input member or the output member, an inner surface of the input-side engaged portion being pressed against an outer surface of the input-side engaging portion by elastic force of the elastic body;

the engaging element, by the pivot-supporting portion being pulled by the input-side engaging portion through the link member when a rotational torque is inputted to the input member, displacing so as to move away from the pressed surface, and by causing the output-side engaged portion to engage with the output-side engaging portion, transmitting the rotational torque inputted to the input member to the output member; and when rotational torque is reversely inputted to the output member, by pressing the pressing surface against the pressed surface due to engagement between the output-side engaging portion and the output-side engaged portion, causing the pressing surface to frictionally engage with the pressed surface.

2. The reverse-input blocking clutch according to claim 1, wherein
the elastic body is not fastened to either the link member or the main engaging element body, and is elastically held between the link member and the main engaging element body.

3. The reverse-input blocking clutch according to claim 1, wherein
at least one of the link member and the main engaging element body, in a portion that comes in contact with the elastic body, has a seating surface for stabilizing a contact position of the elastic body.

4. The reverse-input blocking clutch according to claim 1, wherein
the elastic body comprises a pair of elastic bodies, and the pair of elastic bodies is arranged on both sides of the link member in a second direction orthogonal to both the first direction and an axial direction of the pressed surface.

5. The reverse-input blocking clutch according to claim 4, wherein
the elastic force applied to the link member from each elastic body of the pair of elastic bodies has a component in a direction toward the pressed surface in the first direction, and a component in a direction toward the input-side engaging portion in the second direction.

6. The reverse-input blocking clutch according to claim 5, wherein
of the elastic force applied to the link member from each elastic body of the pair of elastic bodies, the components in directions toward the input-side engaging portion in the second direction cancel each other out.

7. The reverse-input blocking clutch according to claim 1, wherein
the main engaging element body comprises: a pair of main body plates coupled together and arranged so as to overlap in an axial direction of the pressed surface; and a pivot-support shaft, with both side portions in the axial direction of the pivot-support shaft being supported by the pair of main body plates;

the pair of main body plates have the pressing surface and the output-side engaged portion;

the pivot-supporting portion includes the pivot-support shaft;

the link member is arranged between the pair of main body plates, and in a first end portion, has a support hole into which the pivot-support shaft can be loosely inserted; and in a neutral state in which rotational torque is not inputted to either the input member or the output member, there is a gap around the entire circumference between an inner surface of the support hole and the pivot-support shaft.

8. The reverse-input blocking clutch according to claim 7, wherein
the main engaging element body further has a pair of intermediate plates held between the pair of main body plates;

the pair of intermediate plates is arranged in a portion between the pair of main body plates on both side portions in a second direction orthogonal to both the first direction and the axial direction of the pressed surface;

the pivot-support shaft is supported in an intermediate portion of the pair of main body plates in the second direction; and the link member is pivotally arranged in an intermediate portion in the second direction of a portion between the pair of main body plates.

9. The reverse-input blocking clutch according to claim 8, wherein
the elastic body is arranged in a portion between the pair of main body plates and between the link member and the intermediate plate.

10. The reverse-input blocking clutch according to claim 1, wherein
the input-side engaging portion includes a pair of input-side engaging portions, and the engaging element includes a pair of engaging elements, wherein the pair of input-side engaging portions and the pair of engaging elements are arranged so as to sandwich the output-side engaging portion from both sides in the radial direction.

11. The reverse-input blocking clutch according to claim 10, further comprising
a biasing member arranged in a location separated from the output-side engaging portion in a second direction orthogonal to both the first direction and the axial direction of the pressed surface, and elastically spans between the pair of engaging elements.

* * * * *